US012574276B2

(12) United States Patent
Hu et al.

(10) Patent No.: US 12,574,276 B2
(45) Date of Patent: Mar. 10, 2026

(54) REFERENCE SIGNAL SENDING METHOD AND COMMUNICATION APPARATUS

(71) Applicant: HUAWEI TECHNOLOGIES CO., LTD., Shenzhen (CN)

(72) Inventors: Yuanzhou Hu, Shanghai (CN); Gaoning He, Boulogne Billancourt (FR); Jianmin Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 615 days.

(21) Appl. No.: 18/073,613

(22) Filed: Dec. 2, 2022

(65) Prior Publication Data

US 2023/0103598 A1     Apr. 6, 2023

Related U.S. Application Data

(63) Continuation of application No. PCT/CN2021/093734, filed on May 14, 2021.

(30) Foreign Application Priority Data

Jun. 3, 2020    (CN) ......................... 202010495961.X

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01)

(58) Field of Classification Search
CPC ........................... H04L 27/2613; H04L 5/0048
See application file for complete search history.

(56) References Cited

U.S. PATENT DOCUMENTS

| | | |
|---|---|---|
| 2013/0157667 A1 | 6/2013 | Nakamura et al. |
| 2015/0327244 A1 | 11/2015 | Pajukoski et al. |
| 2019/0349163 A1* | 11/2019 | Shao ................. H04W 72/1268 |

(Continued)

FOREIGN PATENT DOCUMENTS

WO       2018137222 A1     8/2018

OTHER PUBLICATIONS

Chinese Office Action issued in corresponding Chinese Application No. 202010495961.X, dated Oct. 24, 2022, pp. 1-9.

(Continued)

*Primary Examiner* — Jackie Zuniga Abad
(74) *Attorney, Agent, or Firm* — HAUPTMAN HAM, LLP

(57) ABSTRACT

A reference signal sending method includes obtaining a frequency-domain cyclic shift factor and a time-domain cyclic shift factor, wherein the frequency-domain cyclic shift factor and the time-domain cyclic shift factor are useable to perform phase rotation on a reference signal sequence. A reference signal sending method further includes generating a second reference signal sequence based on a first reference signal sequence, the frequency-domain cyclic shift factor, and the time-domain cyclic shift factor. A reference signal sending method further includes sending the second reference signal sequence on an antenna port p, wherein p is an element in a set $\{0, 1, \ldots, P-1\}$, and P is an integer greater than or equal to 1.

20 Claims, 10 Drawing Sheets

(56) References Cited

U.S. PATENT DOCUMENTS

2021/0044981 A1* 2/2021 Bhattad .................. H04J 13/18

OTHER PUBLICATIONS

3GPP TSG RAN WG1 Meeting #90, R1-1713409, Evaluation of DL DMRS design, Qualcomm Incorporated, Aug. 21-25, 2017, Prague, Czech Republic, total 14 pages.

3GPP TSG RAN WG1 Meeting #90, R1-1712243, Design of DL DMRS for data transmission, Huawei, HiSilicon, Prague, Czech Republic, Aug. 21-25, 2017, total 8 pages.

Chinese Office Action issued in corresponding Chinese Application No. 202010495961.X, dated May 9, 2022, pp. 1-8.

International Search Report issued in corresponding International Application No. PCT/CN2021/093734, dated Aug. 12, 2021, pp. 1-9.

* cited by examiner

110

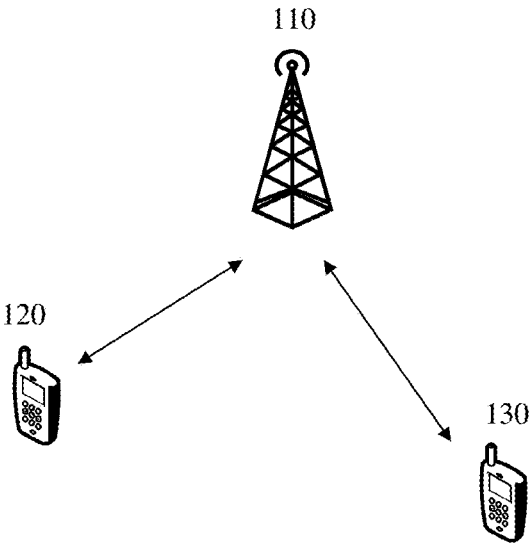

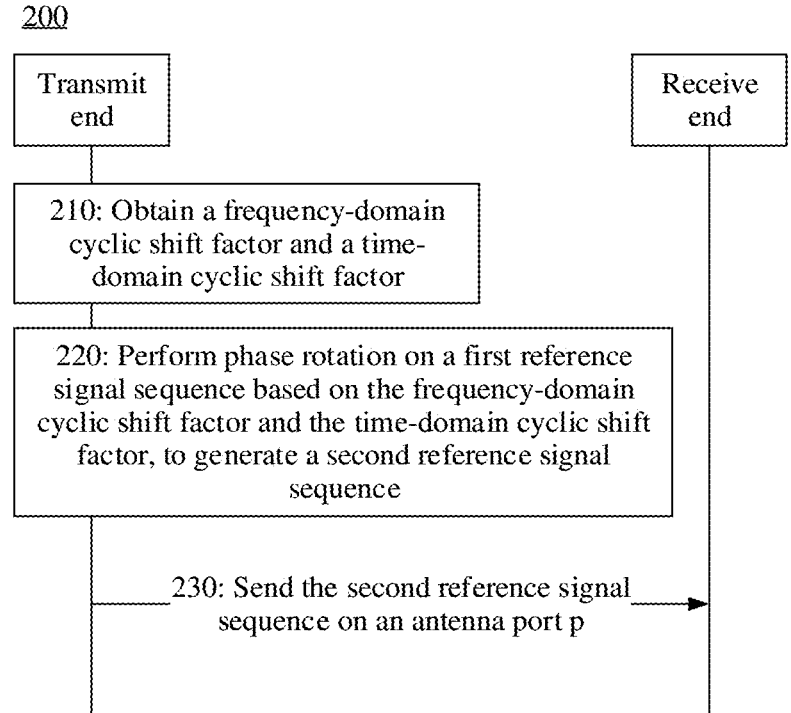

| Transmit end | Receive end |

210: Obtain a frequency-domain cyclic shift factor and a time-domain cyclic shift factor 220: Perform phase rotation on a first reference signal sequence based on the frequency-domain cyclic shift factor and the time-domain cyclic shift factor, to generate a second reference signal sequence 230: Send the second reference signal sequence on an antenna port p

FIG. 2

One resource unit

| Slot 0 | Slot 1 | Slot 2 | Slot 3 |

Starting
subcarrier 12
subcarriers 14 symbols

Starting symbol

⊠ Second reference
signal sequence

☐ Data

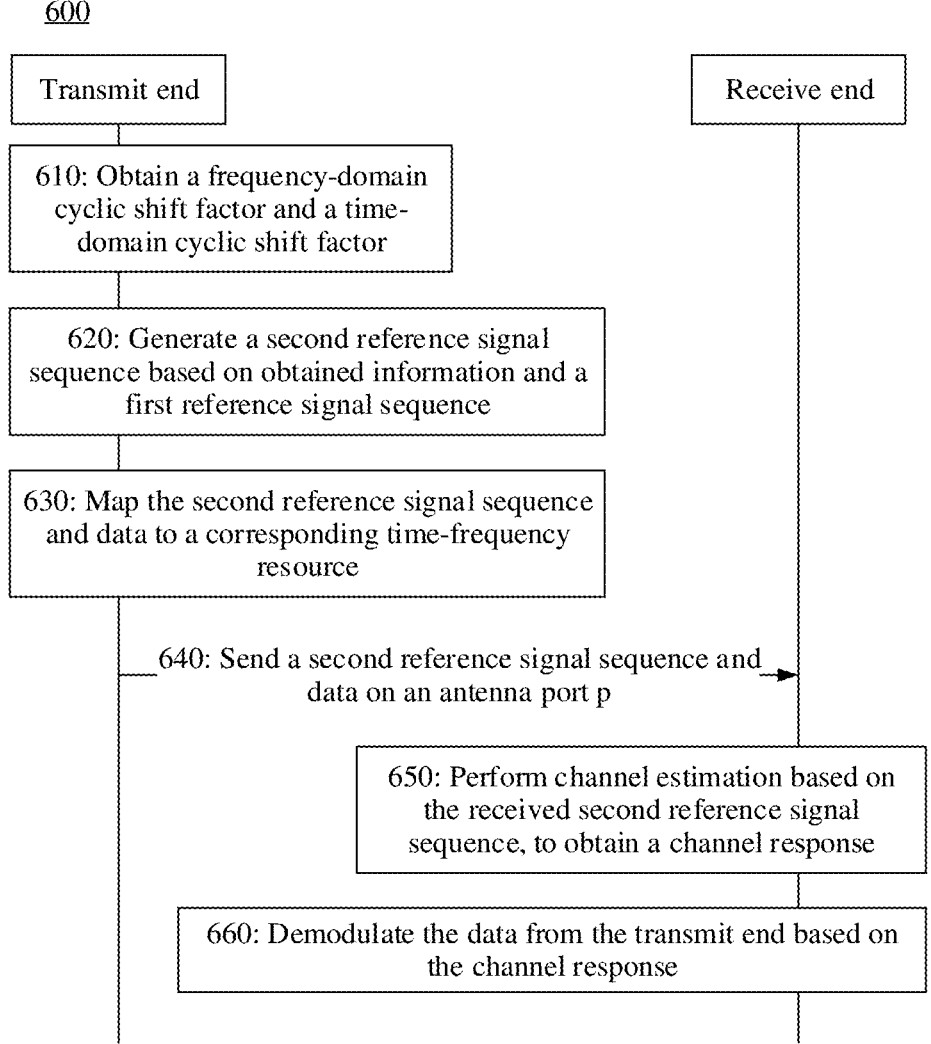

600

Transmit end

610: Obtain a frequency-domain cyclic shift factor and a time-domain cyclic shift factor 620: Generate a second reference signal sequence based on obtained information and a first reference signal sequence 630: Map the second reference signal sequence and data to a corresponding time-frequency resource 640: Send a second reference signal sequence and data on an antenna port p Receive end 650: Perform channel estimation based on the received second reference signal sequence, to obtain a channel response 660: Demodulate the data from the transmit end based on the channel response

FIG. 6

REFERENCE SIGNAL SENDING METHOD AND COMMUNICATION APPARATUS

CROSS-REFERENCE TO RELATED APPLICATIONS

This application is a continuation of International Patent Application No. PCT/CN2021/093734, filed on May 14, 2021, which claims priority to Chinese Patent Application No. 202010495961.X, filed on Jun. 3, 2020. The disclosures of the aforementioned applications are hereby incorporated by reference in their entireties.

TECHNICAL FIELD

This application relates to the field of wireless communication technologies, and more specifically, to a reference signal sending method and a communication apparatus.

BACKGROUND

In a wireless communication system, a reference signal (RS) is a signal sent by a transmit end to a receive end. Because the signal is known to the receive end, communication system—related information or channel-related information, for example, a channel parameter, channel quality, or signal phase rotation caused by a device of the transmit end or the receive end, may be obtained by processing the reference signal received from the transmit end. A reference signal used to assist the receive end in performing channel estimation (CE) on a channel of the transmit end may also be referred to as a demodulation reference signal (DMRS). Usually, to accurately obtain communication system—related information and channel-related information of transmit ends or transmit ports of transmit ends, reference signals of different transmit ends or different transmit ports need to be orthogonal.

However, with continuous evolution of a communication system, a capacity of reference signals in many scenarios is continuously increased. For example, a quantity of antenna ports supported in multiple input-multiple output (MIMO) is continuously increased, and a communication system needs to support a larger quantity of orthogonal multiplexing reference signals, that is, a capacity of reference signals is increased. For another example, a carrier frequency is increased, and a requirement of some terminal devices (for example, a car or a high-speed railway) or in other mobile motion scenarios is increased. In these scenarios, a Doppler shift is increased as the carrier frequency or a moving speed is increased. In this case, a channel response of a transmit end changes rapidly. To accurately track the rapidly changing channel response by using a reference signal, a feasible method is to increase time domain density of reference signals. However, overheads of reference signals are also increased. In this case, it is more difficult to increase a capacity of reference signals.

However, a current capacity of reference signals can no longer meet an increasing requirement for a capacity of reference signals.

SUMMARY

This application provides a reference signal sending method and a communication apparatus, to increase a capacity of reference signal sequences.

According to a first aspect, this application provides a reference signal sequence sending method. The method includes: A transmit end obtains a frequency-domain cyclic shift factor and a time-domain cyclic shift factor, where the frequency-domain cyclic shift factor and the time-domain cyclic shift factor are used to perform phase rotation on a reference signal sequence; generates a second reference signal sequence based on a first reference signal sequence, the frequency-domain cyclic shift factor, and the time-domain cyclic shift factor; and sends the second reference signal sequence on an antenna port p, where $p \in \{0, 1, P-1\}$, and P is an integer greater than or equal to 1.

In this technical solution of this application, the time-domain cyclic shift factor is introduced, and phase rotation is performed on the first reference signal sequence jointly by using the frequency-domain cyclic shift factor and the time-domain cyclic shift factor, to obtain the second reference signal sequence. Because the time-domain cyclic shift factor is introduced, different transmit ends have at least one of different values of the frequency-domain cyclic shift factor and different values of the time-domain cyclic shift factor, that is, orthogonal multiplexing of second reference signal sequences of different transmit ends can be implemented, so that a capacity of second reference signal sequences is increased.

In addition, in a high-speed moving scenario and/or a high-frequency scenario, a Doppler shift is significantly increased compared with that in a low-speed scenario and/or a low-frequency scenario, and overheads of reference signals need to be increased to quickly track a channel change. With this technical solution of this application applied to the high-speed moving scenario and/or the high-frequency scenario, time domain density of reference signals can be increased, so that a capacity of reference signals is increased when overheads of reference signals remain the same, or overheads of reference signals can be reduced when a capacity of reference signals remains the same.

With reference to the first aspect, in some implementations of the first aspect, the generating a second reference signal sequence based on a first reference signal sequence, the frequency-domain cyclic shift factor, and the time-domain cyclic shift factor includes:

generating $N_{rs}$ second reference signal sequences in a second reference signal sequence set based on the first reference signal sequence, the frequency-domain cyclic shift factor, and the time-domain cyclic shift factor, where the first reference signal sequence and each second reference signal sequence each include $M_{rs}$ elements, $N_{rs} \geq 1$ and is an integer, and $M_{rs} > 1$ and is an integer; and performing phase rotation on an element m of the first reference signal sequence by using $e^{j \cdot \alpha_F m}$ and $e^{j \cdot \alpha_T m}$, to obtain an element m of a second reference signal sequence tin the second reference signal sequence set, where $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

Optionally, $e^{j \cdot \alpha_F m}$ may be alternatively replaced with $e^{j \cdot \alpha_F m}$, and $e^{j \cdot \alpha_T m}$ may be alternatively replaced with $e^{j \cdot \alpha_T m}$.

With reference to the first aspect, in some implementations of the first aspect, the sending the second reference signal sequence includes:

sending, in one resource unit, the $N_{rs}$ second reference signal sequences included in the second reference signal sequence set, where the resource unit includes N symbols in time domain, each symbol includes M subcarriers in frequency domain, the $N_{rs}$ second reference signal sequences are mapped to $N_{rs}$ symbols of the N symbols, each second reference signal sequence is mapped to one of the N symbols, each second reference signal sequence is mapped to $M_{rs}$ subcarriers of one of the $N_{rs}$ symbols, $N \geq N_{rs}$, $M \geq M_{rs}$, and both N and M are positive integers.

With reference to the first aspect, in some implementations of the first aspect, the resource unit includes one slot in time domain, the slot includes the N symbols, and each symbol includes the M subcarriers in frequency domain, where the $N_{rs}$ symbols are arranged at equal intervals based on a first value width in the N symbols, and/or the $M_{rs}$ subcarriers are arranged at equal intervals based on a second value width in the M subcarriers included in each symbol of the slot, where the first value width $K_T$ meets the following formula: $K_T = N/N_{rs}$, the second value width $K_F$ meets the following formula: $K_F = M/M_{rs}$, and $K_T$ and $K_F$ are positive integers.

The second reference signal sequences are configured to be arranged in a comb tooth form in time domain and in frequency domain, and a comb tooth size (for example, the first value width or the second value width) may be adjusted, so that density of reference signals (namely, second reference signal sequences) sent in one resource unit, that is, overheads of reference signals, can be flexibly adjusted, to meet requirements in different scenarios, for example, a low-speed scenario and a high-speed scenario.

With reference to the first aspect, in some implementations of the first aspect, the resource unit includes S slots in time domain, each slot includes N/S symbols, each symbol includes the M subcarriers in frequency domain, and N/S is an integer, where the $N_{rs}$ second reference signal sequences are mapped to $N_{rs}$ symbols of the N symbols included in the S slots, and each second reference signal sequence is mapped to $M_{rs}$ subcarriers of one of the $N_{rs}$ symbols.

A size of a resource unit is configured (for example, a quantity of slots included in one resource unit is configured), so that a quantity of slots in time domain that are used to send second reference signal sequences can be flexibly configured, to adapt to requirements in different scenarios. For example, if a large capacity of reference signals is required, one resource unit may be configured to include a larger quantity of slots, so that a value range of the time-domain cyclic shift factor $\alpha_T$ is larger, and a larger quantity of orthogonal multiplexing reference signals are supported.

In addition, for different subcarrier spacings, one slot may be alternatively configured to include different quantities of symbols, to adjust a quantity of symbols in time domain that are used to send reference signals. For example, if a large capacity of reference signals is required, one slot may be configured, by using signaling, to include a larger quantity of symbols, so that a larger quantity of symbols are used to send reference signals, a value range of the time-domain cyclic shift factor $\alpha_T$ is larger, and a larger quantity of orthogonal multiplexing reference signals are supported.

According to a second aspect, a reference signal sequence receiving method is provided. The method includes: A receive end obtains a frequency-domain cyclic shift factor and a time-domain cyclic shift factor, where the frequency-domain cyclic shift factor and the time-domain cyclic shift factor are used to perform phase rotation on a reference signal sequence. The receive end receives a second reference signal sequence from an antenna port p of a transmit end, where $p \in \{0, 1, P-1\}$, and P is an integer greater than or equal to 1. The receive end demodulates the second reference signal sequence based on the frequency-domain cyclic shift factor and the time-domain cyclic shift factor.

Herein, that the receive end demodulates the second reference signal sequence is a process in which the receive end performs channel estimation to obtain a channel response. Further, the receive end performs, by using the channel response, processing such as equalization, demodulation, and decoding on data received from the transmit end, to obtain data sent by the transmit end.

With reference to the second aspect, in some implementations of the second aspect, that the receive end demodulates the second reference signal sequence based on the frequency-domain cyclic shift factor and the time-domain cyclic shift factor includes:

The receive end demodulates $N_{rs}$ second reference signal sequences in a second reference signal sequence set based on the frequency-domain cyclic shift factor and the time-domain cyclic shift factor, where an element m of a second reference signal sequence t in the second reference signal sequence set is obtained by performing phase rotation on an element m of a first reference signal sequence by using $e^{j \cdot \alpha_F m}$, and $e^{j \cdot \alpha_T m}$, the first reference signal sequence and each second reference signal sequence each include $M_{rs}$ elements, $N_{rs} > 1$ and is an integer, $M_{rs} > 1$ and is an integer, $0 \leq m < M_{rs}$, $0 \leq t < N_{rs}$, $\alpha_F$ is the frequency-domain cyclic shift factor, $\alpha_T$ is the time-domain cyclic shift factor, and j indicates an imaginary unit.

With reference to the second aspect, in some implementations of the second aspect, the receiving a second reference signal sequence from an antenna port p of a transmit end includes:

receiving the $N_{rs}$ second reference signal sequences that are included in the second reference signal sequence set in one resource unit and that come from the antenna port p of the transmit end, where the resource unit includes N symbols in time domain, each symbol includes M subcarriers in frequency domain, the $N_{rs}$ second reference signal sequences are mapped to $N_{rs}$ symbols of the N symbols, each second reference signal sequence is mapped to one of the N symbols, each second reference signal sequence is mapped to $M_{rs}$ subcarriers of one of the $N_{rs}$ symbols, $N \geq N_{rs}$, $M \geq M_{rs}$, and both N and M are positive integers.

With reference to the second aspect, in some implementations of the second aspect, the resource unit includes one slot in time domain, the slot includes the N symbols, and each symbol includes the M subcarriers in frequency domain, where the $N_{rs}$ symbols are arranged at equal intervals based on a first value width in the N symbols, and/or the $M_{rs}$ subcarriers are arranged at equal intervals based on a second value width in the M subcarriers included in each symbol of the slot, where the first value width $K_T$ meets the following formula: $K_T = N/N_{rs}$, the second value width $K_F$ meets the following formula: $K_F = M/M_{rs}$, and $K_T$ and $K_F$ are positive integers.

With reference to the second aspect, in some implementations of the second aspect, the resource unit includes S slots in time domain, each slot includes N/S symbols, each symbol includes the M subcarriers in frequency domain, and N/S is an integer, where the $N_{rs}$ second reference signal sequences are mapped to $N_{rs}$ symbols of the N symbols included in the S slots, and each second reference signal sequence is mapped to $M_{rs}$ subcarriers of one of the $N_{rs}$ symbols.

In some implementations of the first aspect or the second aspect, each of P antenna ports included in the set {0, 1, P-1} corresponds to a combination of one value of the frequency-domain cyclic shift factor and one value of the time-domain cyclic shift factor. When a value, corresponding to each antenna port, of the frequency-domain cyclic shift factor is uniquely determined, a value, corresponding to the antenna port, of the time-domain cyclic shift factor is also uniquely determined. Combinations, corresponding to any two of the P antenna ports, of values of the frequency-domain cyclic shift factor and values of the time-domain cyclic shift factor are different.

In some implementations of the first aspect or the second aspect, the frequency-domain cyclic shift factor and the time-domain cyclic shift factor are respectively expressed by using the following formulas:

$$\alpha_F = \pm \frac{2\pi}{N_F} \times \beta_F, \text{ and } \alpha_T = \pm \frac{2\pi}{N_T} \times \beta_T,$$

where
  $\alpha_F$ is the frequency-domain cyclic shift factor, $N_F$ is an integer, $\beta_F$ is a positive integer, a value range of $\beta_F$ is $[0, N_F-1]$, $\alpha_T$ is the time-domain cyclic shift factor, $N_T$ is an integer, $\beta_T$ is a positive integer, and a value range of $\beta_T$ is $[0, N_T-1]$.

It can be learned, according to the formulas for generating the frequency-domain cyclic shift factor $\alpha_F$ and the time-domain cyclic shift factor $\alpha_T$, that $\alpha_F$ may have a maximum of $N_F$ values, and $\alpha_T$ may have a maximum of $N_T$ values. Therefore, a maximum quantity of reference signals (namely, second reference signal sequences) capable of orthogonal multiplexing is $N_F \times N_T$. Compared with a manner of generating a reference signal sequence by using only one cyclic shift factor, a gain of increasing a capacity of reference signals can be obtained.

According to a third aspect, a communication apparatus is provided. The communication apparatus has a function of implementing the method in any one of the first aspect or the possible implementations of the first aspect. The function may be implemented by hardware, or may be implemented by hardware executing corresponding software. The hardware or the software includes one or more units corresponding to the foregoing function.

According to a fourth aspect, this application provides a communication apparatus. The communication apparatus has a function of implementing the method in any one of the second aspect or the possible implementations of the second aspect. The function may be implemented by hardware, or may be implemented by hardware executing corresponding software. The hardware or the software includes one or more units corresponding to the foregoing function.

According to a fifth aspect, this application provides a communication device, including a processor, a memory, and a transceiver. The memory is configured to store a computer program. The processor is configured to invoke and run the computer program stored in the memory, and control the transceiver to send or receive a signal, so that the communication device performs the method in any one of the first aspect or the possible implementations of the first aspect.

According to a sixth aspect, this application provides a communication device, including a processor, a memory, and a transceiver. The memory is configured to store a computer program. The processor is configured to invoke and run the computer program stored in the memory, and control the transceiver to send or receive a signal, so that the communication device performs the method in any one of the first aspect or the possible implementations of the first aspect.

According to a seventh aspect, this application provides a communication apparatus, including a processor and a communication interface. The communication interface is configured to receive a signal and transmit the received signal to the processor. The processor processes the signal, so that the method in any one of the first aspect or the possible implementations of the first aspect is performed.

According to an eighth aspect, this application provides a communication apparatus, including a processor and a communication interface. The communication interface is configured to receive a signal and transmit the received signal to the processor. The processor processes the signal, so that the method in any one of the second aspect or the possible implementations of the second aspect is performed.

Optionally, the communication interface may be an interface circuit, and the processor may be a processing circuit.

According to a ninth aspect, this application provides a computer-readable storage medium. The computer-readable storage medium stores computer instructions. When the computer instructions are run on a computer, the method in any one of the first aspect or the possible implementations of the first aspect is performed.

According to a tenth aspect, this application provides a computer-readable storage medium. The computer-readable storage medium stores computer instructions. When the computer instructions are run on a computer, the method in any one of the second aspect or the possible implementations of the second aspect is performed.

According to an eleventh aspect, this application provides a computer program product. The computer program product includes computer program code. When the computer program code is run on a computer, the method in any one of the first aspect or the possible implementations of the first aspect is performed.

According to a twelfth aspect, this application provides a computer program product. The computer program product includes computer program code. When the computer program code is run on a computer, the method in any one of the second aspect or the possible implementations of the second aspect is performed.

According to a thirteenth aspect, this application provides a chip, including a logic circuit and a communication interface. The communication interface is configured to receive to-be-processed data and/or information, and transmit the to-be-processed data and/or information to the logic circuit, the logic circuit is configured to perform processing of generating the second reference signal sequence, and the communication interface is further configured to output the second reference signal sequence.

The chip may be a chip configured in a transmit end, and the to-be-processed data may be a value of a frequency-domain cyclic shift factor and a value of a time-domain cyclic shift factor, or may be information used to indicate the value of the frequency-domain cyclic shift factor and the value of the time-domain cyclic shift factor, for example, $\beta_F$ and $\beta_T$ in the method embodiments. In addition, the to-be-processed data may further include a first reference signal sequence. The chip receives, through the communication interface, the first reference signal sequence and the information used to indicate the value of the frequency-domain cyclic shift factor and the value of the time-domain cyclic shift factor, and transmits the first reference signal sequence and the information to the logic circuit; the logic circuit processes the first reference signal sequence based on the value of the frequency-domain cyclic shift factor and the value of the time-domain cyclic shift factor, to generate the second reference signal sequence; and the chip outputs the second reference signal sequence through the communication interface.

Optionally, the communication interface may include an input interface and an output interface. The input interface is configured to receive the to-be-processed data and/or information, and the output interface is configured to output the second reference signal sequence.

According to a fourteenth aspect, this application provides a chip, including a logic circuit and a communication interface. The communication interface is configured to receive to-be-processed data and/or information, and transmit the to-be-processed data and/or information to the logic circuit, the logic circuit is configured to perform processing of demodulating the second reference signal sequence, and the communication interface is further configured to output a demodulation result.

The chip may be a chip configured in a receive end, and the to-be-processed data may be a value of a frequency-domain cyclic shift factor and a value of a time-domain cyclic shift factor, or may be information used to indicate the value of the frequency-domain cyclic shift factor and the value of the time-domain cyclic shift factor, for example, $\beta_F$ and $\beta_T$ in the method embodiments. In addition, the to-be-processed data may further include the second reference signal sequence. The chip receives, through the communication interface, the second reference signal sequence and the information used to indicate the value of the frequency-domain cyclic shift factor and the value of the time-domain cyclic shift factor, and transmits the second reference signal sequence and the information to the logic circuit; the logic circuit performs demodulation processing on the second reference signal sequence based on the value of the frequency-domain cyclic shift factor and the value of the time-domain cyclic shift factor, to obtain the demodulation result; and the chip outputs the demodulation result through the communication interface.

Optionally, the communication interface may include an input interface and an output interface. The input interface is configured to receive the to-be-processed data and/or information, and the output interface is configured to output the demodulation result.

In this embodiment of this application, the demodulation result may be a channel response of a transmit end. Optionally, if a plurality of transmit ends send reference signals to the receive end through MIMO, the demodulation result includes respective channel responses of the plurality of transmit ends.

According to a fifteenth aspect, this application provides a wireless communication system, including the communication device according to the fifth aspect and/or the communication device according to the sixth aspect.

BRIEF DESCRIPTION OF DRAWINGS

FIG. 1 shows an example of an architecture of a communication system to which an embodiment of this application is applicable;

FIG. 2 is a schematic flowchart of a reference signal sending method according to this application;

FIG. 6 shows an example of a flowchart of sending and receiving a second reference signal sequence;

DESCRIPTION OF EMBODIMENTS

Figure 3:
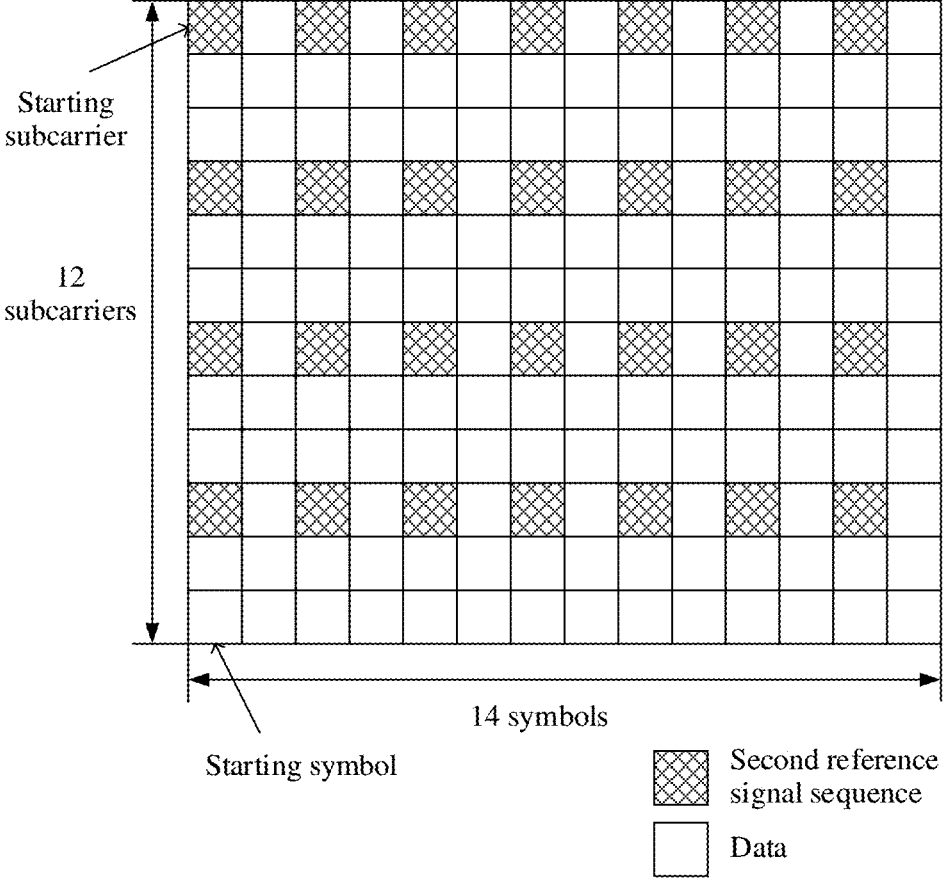
FIG. 3 shows an example of a mapping pattern of second reference signal sequences in one resource unit.

The following describes technical solutions of this application with reference to the accompanying drawings.

Technical solutions of this application are applicable to the following communication systems, including but not limited to a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, three application scenarios of a fifth generation (5G) mobile communication system: eMBB, URLLC, and eMTC, and the like.

A network device in embodiments of this application is an apparatus deployed in a radio access network to provide a wireless communication function for a mobile station (MS), for example, a base station. The base station may include a macro base station, a micro base station (also referred to as a small cell), a relay station, an access point, and the like in various forms. In systems in which different radio access technologies are used, names of devices with a function of a base station may be different. For example, in a third generation (3G) system, the base station is referred to as a NodeB; in an LTE system, the base station is referred to as an evolved NodeB (eNB or eNodeB); and in a 5G system, the base station is referred to as a next generation NodeB (gNB). In addition, the network device may be alternatively a device that plays a function of a base station in device to device (D2D), machine type communication, or internet of vehicles communication, a satellite device, a base station device in a future communication network, or the like. For ease of description, in all the embodiments of this application, all the foregoing apparatuses that provide a wireless communication function for the MS are referred to as a network device or a base station or a BS. In this application, the base station may also be referred to as a base station device.

A terminal device in embodiments of this application includes various devices with a wireless communication function, for example, a handheld device, a vehicle-mounted device, a wearable device, a computing device, or another processing device connected to a wireless modem; and may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a satellite phone, a cellular phone, a smartphone, a wireless data card, a wireless modem, a machine type communication (MTC) device, a terminal device in a 5G network or a future communication network, or the like. The terminal device is also referred to as UE, a terminal, or the like.

FIG. 1 shows an example of an architecture of a communication system to which an embodiment of this application is applicable. As shown in FIG. 1, the communication system includes one or more network devices (for example, 110 in FIG. 1). The network device 110 communicates with one or more terminal devices, for example, terminal devices 120 and 130 in FIG. 1. It should be understood that only one network device 110 and two terminal devices 120 and 130 are used as examples in FIG. 1, but the communication system may alternatively include more network devices, and each network device may also communicate with one or more terminal devices.

In addition, communication between a network device and a terminal device may be uplink transmission or downlink transmission. This is not limited. For example, in downlink transmission, a transmit end in this application is a network device, for example, a base station device, and a receive end is a terminal device; and in uplink transmission, a transmit end in this application is a terminal device, and a receive end is a network device, for example, a base station device.

The following describes technical solutions of this application.

FIG. 2 is a schematic flowchart of a reference signal sending method according to this application. Optionally, the process shown in FIG. 2 may be performed by a transmit end, or may be performed by a module and/or a device (for example, a chip or an integrated circuit) or the like that is mounted in a transmit end and that has a corresponding function. The following provides descriptions by using an example in which the process is performed by a transmit end.

210: The transmit end obtains a frequency-domain cyclic shift factor and a time-domain cyclic shift factor.

The frequency-domain cyclic shift factor and the time-domain cyclic shift factor are used to perform phase rotation on a reference signal sequence.

There may be a plurality of specific implementations of obtaining, by the transmit end, the frequency-domain cyclic shift factor and the time-domain cyclic shift factor. This is not limited in this application.

For example, a receive end may notify, through indication by using signaling, the transmit end of values of the frequency-domain cyclic shift factor and the time-domain cyclic shift factor. For another example, values of some parameters used to determine the frequency-domain cyclic shift factor and the time-domain cyclic shift factor may be predefined, and the receive end notifies, through indication by using signaling, the transmit end of other parameters. The transmit end may determine respective values of the frequency-domain cyclic shift factor and the time-domain cyclic shift factor based on the predefined values of the some parameters and the values, indicated by the signaling, of the other parameters. The following describes the manners in detail. In addition, a person skilled in the art may alternatively use another manner.

220: The transmit end generates a second reference signal sequence based on a first reference signal sequence, the frequency-domain cyclic shift factor, and the time-domain cyclic shift factor.

The transmit end may determine the first reference signal sequence in a plurality of manners, and further perform phase rotation on the first reference signal sequence by using the frequency-domain cyclic shift factor and the time-domain cyclic shift factor, to obtain the second reference signal sequence.

The following describes some manners of obtaining, by the transmit end, the first reference signal sequence as examples.

Manner 1

The first reference signal sequence is a ZC sequence.

For example, a first reference signal sequence whose length is $M_{rs}$ may be generated by using the following formulas:

$$r(m) = x_q(m \bmod N_{ZC}), 0 \le m < M_{rs} \tag{1}$$

$$x_q(n) = e^{-j\frac{\pi \times q \times n \times (n+1)}{N_{ZC}}}, 0 \le n < N_{ZC}, \tag{2}$$

where $x_q$ may be referred to as a ZC sequence whose length is $N_{ZC}$, where q is a root of the ZC sequence; both n and m are integers; mod indicates a modulo operation, for example, a value of 2 mod 5 is 2; $N_{ZC}$ may be the largest prime number less than $M_{rs}$; and usually, q and $N_{ZC}$ are co-prime to each other.

Manner 2

The first reference signal sequence is generated by using a pseudo-random sequence.

For example, the transmit end may generate bit data by using the pseudo-random sequence, and modulate the bit data to obtain the first reference signal sequence. Optionally, modulation may be performed in a manner of binary phase shift keying (BPSK), quadrature phase shift keying (QPSK), or the like.

In an example, the pseudo-random sequence used to generate the first reference signal sequence may be a Gold sequence whose length is 31 in the section 5.2.1 of the 3GPP TS38211-f80 standard.

Manner 3

The first reference signal sequence includes a plurality of elements. Particularly, all elements of the first reference signal sequence are the same. In this case, the first reference signal sequence may be expressed by using the following formula:

$$r(m) = A \tag{3},$$

where

A is a constant, and may be a real number, an imaginary number, or a complex number.

For example, A=1, A=j, or $$A = A = \frac{1}{\sqrt{2}} + \frac{j}{\sqrt{2}}.$$

After obtaining the first reference signal sequence, the transmit end performs phase rotation on the first reference signal sequence by using the frequency-domain cyclic shift factor and the time-domain cyclic shift factor, to obtain a plurality of second reference signal sequences. In this application, a set including the plurality of second reference signal sequences is referred to as a second reference signal sequence set.

A second reference signal sequence in the following descriptions generally means a second reference signal sequence, unless otherwise specified.

For a process of performing phase rotation on the first reference signal sequence by using the frequency-domain cyclic shift factor and the time-domain cyclic shift factor, to obtain the second reference signal sequence, refer to the following formula:

$$r_{2,t}(m)=r_1(m)\times e^{j\cdot\alpha_F m}\times e^{j\cdot\alpha_T t}, 0\leq m < M_{rs}, 0\leq t < N_{rs} \quad (4),$$

where r₁(m) indicates an element m of the first reference signal sequence, and $r_{2,t}(m)$ indicates an element m of a second reference signal sequence t in the second reference signal sequence set.

In addition, $M_{rs}$ is a length of the second reference signal sequence (also a length of the first reference signal sequence), that is, a quantity of elements included in the second reference signal sequence, and $N_{rs}$ is a quantity of second reference signal sequences included in the second reference signal sequence set, where $M_{rs}$ and $N_{rs}$ are positive integers.

Optionally, in an example, the first reference signal sequence belongs to a first reference signal sequence set, in other words, the first reference signal sequence set includes the first reference signal sequence, where a quantity of first reference signal sequences in the first reference signal sequence set may be greater than or equal to 1.

When the quantity of first reference signal sequences included in the first reference signal sequence set is greater than 1, any two first reference signal sequences may be the same or different.

When the quantity of first reference signal sequences included in the first reference signal sequence set is greater than 1, the second reference signal sequence may be generated by using the following formula:

$$r_{2,t}(m)=r_{1,t}(m)\times e^{j\cdot\alpha_F m}\times e^{j\cdot\alpha_T t}, 0\leq m < M_{rs}, 0\leq t < N_{rs} \quad (5),$$

where $r_{1,t}(m)$ indicates an element m of a first reference signal sequence t in the first reference signal sequence set, $r_{2,t}(m)$ indicates the element m of the second reference signal sequence t in the second reference signal sequence set, $N_{rs}$ is the quantity of second reference signal sequences included in the second reference signal sequence set, and is also the quantity of first reference signal sequences included in the first reference signal sequence set, and $M_{rs}$ is a quantity of elements included in the first reference signal sequence, and is also the quantity of elements included in the second reference signal sequence.

In the manner, expressed by the formula (4) or the formula (5), of generating the second reference signal sequence, lengths of the first reference signal sequence and the second reference signal sequence are the same, that is, the first reference signal sequence and the second reference signal sequence include a same quantity of elements.

In another example, lengths of the first reference signal sequence and the second reference signal sequence may be alternatively different.

For example, a length of the first reference signal sequence is denoted as $M_{1,rs}$, and a length of the second reference signal sequence is denoted as $M_{2,rs}$, where $M_{1,rs}$ and $M_{2,rs}$ are positive integers.

In this implementation, the second reference signal sequence may be generated by using the following formula:

$$r_{2,t}(m)=r_1((m+\Delta)\bmod M_{1,rs})\times e^{j\cdot\alpha_F m}\times e^{j\cdot\alpha_T t}, 0\leq m < M_{2,rs},$$
$$0\leq t < N_{rs} \quad (6),$$

where

Δ is an offset, and Δ is an integer, and may be predefined.

It can be learned according to the formula (6) that the element m (namely, $r_{2,t}(m)$) of the second reference signal sequence tin the second reference signal sequence set is obtained by performing phase rotation on an element (m+Δ) modM₁,ᵣₛ of the first reference signal sequence by using $e^{j\cdot\alpha_F m}$ and $e^{j\cdot\alpha_T t}$.

The following describes in detail the frequency-domain cyclic shift factor and the time-domain cyclic shift factor in this embodiment of this application.

For ease of description, in the following descriptions, the frequency-domain cyclic shift factor is denoted as $\alpha_F$, and the time-domain cyclic shift factor is denoted as $\alpha_T$.

In this embodiment of this application, $\alpha_F$ and $\alpha_T$ may be respectively determined by using the following formulas:

$$\alpha_F = \pm \frac{2\pi}{N_F} \times \beta_F, \quad (7)$$

where $N_F$ is an integer, $\beta_F$ is an integer, and a value range of $\beta_T$ is [0, $N_F-1$]; and $$\alpha_T = \pm \frac{2\pi}{N_T} \times \beta_T, \quad (8)$$

where $N_T$ is an integer, $\beta_T$ is an integer, and a value range of $\beta_T$ is [0, $N_T-1$].

Optionally, in an example, $\beta_F$ and $\beta_T$ may be configured by the receive end for the transmit end through indication by using signaling. It can be learned that, when a value of $\beta_F$ is any integer ranging from 0 to $N_F-1$, a minimum quantity of bits of signaling used by the receive end to indicate $\beta_F$ is $\lceil \log_2 N_F \rceil$. Likewise, when a value of $\beta_T$ is any integer ranging from 0 to $N_T-1$, a minimum quantity of bits of signaling used by the receive end to indicate $\beta_T$ is $\lceil \log_2 N_T \rceil$, where $\lceil \ \rceil$ indicates rounding up.

Optionally, the value of $\beta_F$ may be alternatively some values ranging from 0 to $N_F-1$. For example, when a value of $N_F$ is 12, the value of $\beta_F$ may be values 0, 3, 6, and 9 in 0 to 11. In this case, the value of $\beta_F$ may be indicated by using 2-bit signaling. Values indicated by the 2-bit signaling are 0 to 3, and are in a one-to-one correspondence with four possible values of $\beta_F$: 0, 3, 6, and 9. For example, the value 0 indicated by the 2-bit signaling corresponds to the value 0 of $\beta_F$ the value 1 indicated by the signaling corresponds to the value 3 of $\beta_F$ the value 2 indicated by the signaling corresponds to the value 6 of $\beta_F$, and the value 3 indicated by the signaling corresponds to the value 9 of $\beta_F$.

Optionally, the value of $\beta_T$ may be alternatively some values ranging from 0 to $N_T-1$. For example, when a value of $N_T$ is 8, the value of $\beta_T$ may be values 0, 2, 4, and 6 in 0 to 7. In this case, the value of $\beta_T$ may be indicated by using 2-bit signaling. Values indicated by the 2-bit signaling are 0 to 3, and are in a one-to-one correspondence with four possible values of $\beta_T$: 0, 2, 4, and 6. For example, the value 0 indicated by the 2-bit signaling corresponds to the value 0 of $\beta_T$, the value 1 indicated by the signaling corresponds to the value 2 of $\beta_T$ the value 2 indicated by the signaling corresponds to the value 4 of $\beta_T$ and the value 3 indicated by the signaling corresponds to the value 6 of $\beta_T$.

The receive end may notify, through indication by using signaling or in a predefined manner, the transmit end of $N_F$ and $N_T$.

In the predefined manner, the value of $N_F$ may be 2, 4, 6, 8, 10, 12, or the like; or the value of $N_F$ may be a quantity of subcarriers included in one resource block (RB), for example, 12.

For example, $$\alpha_F = \frac{2\pi}{N_F} \times \beta_F,$$

$N_F=6$, and the value of $\beta_F$ is any integer ranging from 0 to $N_F-1$. A value of $\alpha_F$ may be 1, $\pi/3$, $2\pi/3$, $\pi$, $4\pi/3$ or $5\pi/3$.

Likewise, in the predefined manner, the value of $N_T$ may be 2, 4, 6, 8, 10, 12, or the like; or the value of $N_T$ may be determined by the quantity $N_{rs}$ of second reference signal sequences, for example, $N_T=N_{rs}$, $N_T=\lceil N_{rs}/K \rceil$, or $N_T=\lfloor N_{rs}/K \rfloor$, where K is a positive integer greater than 1. For example, K=2. Particularly, when $N_{rs}/K$ is an integer, the value of $N_T$ is as follows: $N_T=N_{rs}/K$.

For example, $$\alpha_F = \frac{2\pi}{N_F} \times \beta_F, \text{ and } \alpha_T = -\frac{2\pi}{N_T} \times \beta_T.$$

It can be learned that the first reference signal sequence t, namely, $r_{1,t}$, in the first reference signal sequence set and the second reference signal sequence t, namely, $r_{2,t}$, in the second reference signal sequence set meet the following formula:

$$r_{2,t}(m) = r_{1,t}(m) \times e^{j \times \frac{2\pi}{N_F} \beta_F \times m} \times e^{-j \times \frac{2\pi}{N_T} \beta_T \times t}, \qquad (9)$$

$$0 \le m < M_{rs}, 0 \le t < N_{rs}$$

It can be found that, in this embodiment of this application, a reference signal sequence actually sent by the transmit end is determined jointly by using the frequency-domain cyclic shift factor $\alpha_F$ and the time-domain cyclic shift factor $\alpha_T$. Different transmit ends have at least one of different $\alpha_F$ and different $\alpha_T$, that is, orthogonal multiplexing can be implemented, thereby increasing a capacity of reference signals capable of orthogonal multiplexing.

It can be learned according to the formulas (7) and (8) that the frequency-domain cyclic shift factor $\alpha_F$ may have a maximum of $N_F$ values, and the time-domain cyclic shift factor $\alpha_T$ may have a maximum of $N_T$ values. Therefore, a maximum quantity of reference signals (namely, second reference signal sequences) capable of orthogonal multiplexing is $N_F \times N_T$. Compared with a manner of generating a reference signal sequence by using only one cyclic shift factor, a gain of increasing a capacity of reference signals can be obtained.

In addition, in a high-speed moving scenario and/or a high-frequency scenario, a Doppler shift is significantly increased compared with that in a low-speed scenario and/or a low-frequency scenario, and overheads of reference signals need to be increased to quickly track a channel change.

With this technical solution of this application applied to the high-speed moving scenario and/or the high-frequency scenario, time domain density of reference signals can be increased, so that a capacity of reference signals is increased when overheads of reference signals remain the same, or overheads of reference signals can be reduced when a capacity of reference signals remains the same.

It can be learned that the frequency-domain cyclic shift factor $\alpha_F$ may have a maximum of $N_F$ different values, and the time-domain cyclic shift factor $\alpha_T$ may have a maximum of $N_T$ different values. Therefore, a maximum quantity of reference signal sequences capable of orthogonal multiplexing is $N_F \times N_T$. Compared with a manner of determining a reference signal sequence by using only one cyclic shift factor, a gain of increasing a capacity of reference signal sequences (namely, the second reference signal sequences in this application) can be achieved in this embodiment of this application.

As described above, the receive end may notify, through indication by using signaling, the transmit end of a, and $\alpha_T$. For example, the signaling may be downlink control information (DCI) or higher layer signaling, for example, radio resource control (RRC) signaling.

In this application, it is assumed that values of the frequency-domain cyclic shift factor $\alpha_F$ constitute a first set, and values of the time-domain cyclic shift factor $\alpha_T$ constitute a second set, where the first set includes $N_1$ elements, the second set includes $N_2$ elements, and $N_1$ and $N_2$ are positive integers.

A frequency-domain cyclic shift factor corresponding to an antenna port $p_0$ of the P antenna ports is an element $i_1$ in the first set, and a time-domain cyclic shift factor corresponding to the antenna port $p_0$ is an element $i_2$ in the second set; and a frequency-domain cyclic shift factor corresponding to an antenna port $p_1$ of the P antenna ports is an element $q_1$ in the first set, and a time-domain cyclic shift factor corresponding to the antenna port $p_1$ is an element $q_2$ in the second set, where when $p_0$ is not equal to $p_1$, at least one of $i_1$ and $q_1$ is not equal to $i_2$ and $q_2$ respectively, to be specific, $i_1$ is not equal to $i_2$, and $q_1$ is equal to $q_2$; or $i_1$ is equal to $i_2$, and $q_1$ is not equal to $q_2$; or $i_1$ is not equal to $i_2$, and $q_1$ is not equal to $q_2$, where $p_0$, $p_1$, $q_1$, $q_2$, $i_1$, and $i_2$ are integers.

$\alpha_F$ and $\alpha_T$ may be determined based on a one-to-one correspondence between the values indicated by the signaling and the values of $\alpha_F$ and $\alpha_T$. For example, the one-to-one mapping relationship may be expressed by using a table.

For example, $\alpha_F$ is used as an example. Assuming that $$\alpha_F = \frac{2\pi}{N_F} \times \beta_F,$$

the value of $N_F$ is 8, and the value of $\beta_F$ is 0 to 7, $\alpha_F$ has a total of eight values: 1, $\pi/4$, $\pi/2$, $3\pi/4$, $\pi5\pi/4$, $3\pi/2$, or $7\pi/4$. In this case, the value of $\alpha_F$ may be indicated by using 3-bit signaling (denoted as $i_F$). Eight different values 0 to 7 of $i_F$ are in a one-to-one correspondence with the eight values of $\alpha_F$ respectively, as shown in Table 1.

TABLE 1

| $i_r$ | $\alpha_F$ |
|---|---|
| 0 | 1 |
| 1 | $\dfrac{\pi}{4}$ |
| 2 | $\dfrac{\pi}{2}$ |
| 3 | $\dfrac{3\pi}{4}$ |
| 4 | $\pi$ |
| 5 | $\dfrac{5\pi}{4}$ |
| 6 | $\dfrac{3\pi}{2}$ |
| 7 | $\dfrac{7\pi}{4}$ |

It should be understood that the one-to-one mapping relationship shown in Table 1 is merely used as an example, and the value of $\alpha_F$ may include only some values shown in Table 1. In addition, a correspondence between each value indicated by $i_F$ and the value of $\alpha_F$ is also merely used as an example. For example, in Table 1, when the value of $i_F$ is 0, a corresponding value of $\alpha_F$ is 1; or when the value of $i_F$ is 1, a corresponding value of $\alpha_F$ is 1. That is, provided that different values of $i_F$ and values of $\alpha_F$ meet a one-to-one mapping relationship, a specific mapping relationship is not limited. Cases of other tables in the following embodiments are also similar, and descriptions are not repeated.

For example, $\alpha_T$ is used as an example. Assuming that $$\alpha_T = \frac{2\pi}{N_T} \times \beta_T,$$

the value of $N_T$ is 8, and the value of $\beta_T$ is 0 to 7, $\alpha_T$ has a total of eight values: 1, $\pi/4$, $\pi/2$, $3\pi/4$, $\pi 5\pi/4$, $3\pi/2$, or $7\pi/4$. In this case, the value of $\alpha_T$ may be indicated by using 3-bit signaling (denoted as $i_T$). Eight different values 0 to 7 of $i_T$ are in a one-to-one correspondence with the eight values of $\alpha_T$ respectively, as shown in Table 2.

TABLE 2

| $i_r$ | $\alpha_T$ |
|---|---|
| 0 | 1 |
| 1 | $\dfrac{\pi}{4}$ |
| 2 | $\dfrac{\pi}{2}$ |
| 3 | $\dfrac{3\pi}{4}$ |
| 4 | $\pi$ |
| 5 | $\dfrac{5\pi}{4}$ |

TABLE 2-continued

| $i_r$ | $\alpha_T$ |
|---|---|
| 6 | $\dfrac{3\pi}{2}$ |
| 7 | $\dfrac{7\pi}{4}$ |

The values of the frequency-domain cyclic shift factor $\alpha_F$ and the time-domain cyclic shift factor $\alpha_T$ may be alternatively determined by using a value indicated by same signaling. For example, assuming that $$\alpha_F = \frac{2\pi}{N_F} \times \beta_F,$$

the value of $N_F$ is 4, and the value of $\beta_F$ is 0 to 3, $\alpha_F$ has four different values: 1, $\pi/2$, $\pi$, and $3\pi/2$; or assuming that $$\alpha_T = \frac{2\pi}{N_T} \times \beta_T,$$

the value of $N_T$ is 2, and the value of $\beta_T$ is 0 to 1, $\alpha_T$ has two different values: 1 and $\pi$. In this case, the values of $\alpha_F$ and $\alpha_T$ are determined by using 3-bit signaling (denoted as $i_{TF}$). In an example for description, a determining manner is shown in Table 3.

TABLE 3

| $i_{TF}$ | $\alpha_F$ | $\alpha_T$ |
|---|---|---|
| 0 | 1 | 1 |
| 1 | 1 | $\pi$ |
| 2 | $\pi$ | 1 |
| 3 | $\pi$ | $\pi$ |
| 4 | $\dfrac{\pi}{2}$ | 1 |
| 5 | $\dfrac{\pi}{2}$ | $\pi$ |
| 6 | $\dfrac{3\pi}{2}$ | 1 |
| 7 | $\dfrac{3\pi}{2}$ | $\pi$ |

It should be noted that the correspondence between $i_F$ and $\alpha_F$, the correspondence between $i_T$ and $\alpha_T$, and the correspondence between $i_{TF}$ and $\alpha_F$ and $\alpha_T$ in the foregoing tables are merely examples. Other possible correspondences are not excluded.

$\alpha_F$ and $\alpha_T$ may be determined based on the one-to-one correspondence between the values indicated by the signaling and the values of $\alpha_F$ and $\alpha_T$. It can be learned that the value of $\alpha_F$ is in a one-to-one correspondence with the value of $\beta_F$, and the value of $\alpha_T$ is in a one-to-one correspondence with the value of $\beta_T$. Therefore, $\alpha_F$ and $\alpha_T$ may be alternatively determined based on a one-to-one correspondence between the values indicated by the signaling and the values of $\beta_F$ and $\beta_T$. For example, the one-to-one mapping relationship may be expressed by using a table.

For example, $\beta_F$ is used as an example. Assuming that $$\alpha_F = \frac{2\pi}{N_F} \times \beta_F,$$

the value of $N_F$ is 8, and the value of $\beta_F$ is 0 to 7. In this case, the value of $\beta_F$ may be indicated by using 3-bit signaling (denoted as $i_F$), and further, the value of $\alpha_F$, is determined based on the value of $\beta_F$. Eight different values 0 to 7 of $i_F$ are in a one-to-one correspondence with the eight values of $\beta_F$ respectively, as shown in Table 4.

TABLE 4

| $i_F$ | $\beta_F$ |
|---|---|
| 0 | 0 |
| 1 | 4 |
| 2 | 2 |
| 3 | 6 |
| 4 | 1 |
| 5 | 3 |
| 6 | 5 |
| 7 | 7 |

For example, $\alpha_T$ is used as an example. Assuming that $$\alpha_T = \frac{2\pi}{N_T} \times \beta_T,$$

the value of $N_T$ is 8, and the value of $\beta_T$ is 0 to 7. In this case, the value of $\beta_T$ may be indicated by using 3-bit signaling (denoted as $i_T$), and further, the value of $\alpha_T$ is determined based on the value of $\beta_T$. Eight different values 0 to 7 of $i_T$ are in a one-to-one correspondence with the eight values of $\beta_T$ respectively, as shown in Table 5.

TABLE 5

| $i_T$ | $\beta_T$ |
|---|---|
| 0 | 0 |
| 1 | 4 |
| 2 | 2 |
| 3 | 6 |
| 4 | 1 |
| 5 | 3 |
| 6 | 5 |
| 7 | 7 |

The values of $\beta_F$ and $\beta_T$ may be alternatively determined by using a value indicated by same signaling.

For example, it is assumed that $$\alpha_F = \frac{2\pi}{N_F} \times \beta_F,$$

the value of $N_F$ is 4, and the value of $\beta_F$ is 0 to 3; and it is assumed that $$\alpha_T = \frac{2\pi}{N_T} \times \beta_T,$$

the value of $N_T$ is 2, and the value of $\beta_T$ is 0 to 1. In this case, the values of $\beta_F$ and $\beta_T$ are determined by using 3-bit signaling (denoted as $i_{TF}$), and further, the values of $\alpha_F$ and $\alpha_T$ may be determined. In an example for description, a determining manner is shown in Table 6.

TABLE 6

| $i_{TF}$ | $\beta_F$ | $B_T$ |
|---|---|---|
| 0 | 0 | 0 |
| 1 | 0 | 1 |
| 2 | 2 | 0 |
| 3 | 2 | 1 |
| 4 | 1 | 0 |
| 5 | 1 | 1 |
| 6 | 3 | 0 |
| 7 | 3 | 1 |

It can be learned that the values of $e^{j \cdot \alpha_F \cdot m}$ and $e^{j \cdot \alpha_T \cdot t}$ may be determined based on the values of $\alpha_F$ and $\alpha_T$. For example, when the value of $\alpha_F$ is $\pi/2$, based on different values of m, $e^{j \cdot \alpha_F \cdot m}$ is obtained by repeating a sequence [1, j, −1, −j]. Assuming that $$\alpha_F = \frac{2\pi}{N_F} \times \beta_F,$$

it can be learned that $N_F$ consecutive elements in $e^{j \cdot \alpha_F \cdot m}$ have different values, and there are only $N_F$ possible values. Therefore, it can be learned according to the formula (7) and the formula (8) that $e^{j \cdot \alpha_F \cdot m}$ has $N_F$ possible values, and $e^{j \cdot \alpha_T \cdot t}$ has $N_T$ possible values.

Therefore, an element 0 to an element $N_F$−1 in $e^{j \cdot \alpha_F \cdot m}$ may be expressed as a sequence $W_F$ whose length is $N_F$, and an element 0 to an element $N_T$−1 in $e^{j \cdot \alpha_T \cdot t}$ may be expressed as a sequence $W_T$ whose length is $N_T$. In this case, $e^{j \cdot \alpha_F \cdot m}$ and $e^{j \cdot \alpha_T \cdot t}$ may be expressed as follows:

$$e^{j \cdot \alpha_F \cdot m} = W_F(m \bmod N_F), 0 \leq m < M_{rs} \tag{10}$$

$$e^{j \cdot \alpha_T \cdot t} = W_F(t \bmod N_T) 0 \leq t < N_{rs} \tag{11}$$

Therefore, $e^{j \cdot \alpha_F \cdot m}$ and $e^{j \cdot \alpha_T \cdot t}$ may be further determined based on a one-to-one correspondence between the values indicated by the signaling and the sequence $W_F$ and the sequence $W_T$. For example, the one-to-one mapping relationship may be expressed by using a table.

For example, it is assumed that the value of $N_F$ is 4 and the value of $N_T$ is 2. In this case, values of the sequence $W_F$ and the sequence $W_T$ are determined by using 3-bit signaling (denoted as $i_{TF}$), and further, the values of $e^{j \cdot \alpha_F \cdot m}$ and $e^{j \cdot \alpha_T \cdot t}$ may be determined. $N_F$ elements of the sequence $W_F$ may be expressed as $[W_F(0), W_F(1), W_F(2), W_F(3)]$. $N_T$ elements of the sequence $W_T$ may be expressed as $[W_T(0), W_T(1)]$. In an example for description, a determining manner is shown in Table 7.

TABLE 7

| $i_{TF}$ | $[W_F(0), W_F(1), W_F(2), W_F(3)]$ | $[W_T(0), W_T(1)]$ |
|---|---|---|
| 0 | [1, 1, 1, 1] | [1, 1] |
| 1 | [1, 1, 1, 1] | [1, −1] |
| 2 | [1, −1, 1, −1] | [1, 1] |
| 3 | [1, −1, 1, −1] | [1, −1] |
| 4 | [1, j, −1, −j] | [1, 1] |
| 5 | [1, j, −1, −j] | [1, −1] |
| 6 | [1, −j, −1, j] | [1, 1] |
| 7 | [1, −j, −1, j] | [1, −1] |

Frequency-domain cyclic shift factors $\alpha_F$ and time-domain cyclic shift factors $\alpha_T$ of different cells may be configured to be different, to reduce mutual interference between data sent by terminal devices of different cells, and alleviate inter-cell interference.

After generating the second reference signal sequence by using the foregoing method, the transmit end sends the second reference signal sequence to the receive end, as described in step 230.

230: The transmit end sends the second reference signal sequence on an antenna port p.

The antenna port $p \in \{0, 1, \ldots, P-1\}$, and P is an integer greater than or equal to 1.

One second reference signal sequence is carried in one symbol in time domain. Assuming that the symbol includes M subcarriers in frequency domain, the second reference signal sequence is mapped to $M_{rs}$ subcarriers of the M subcarriers included in the symbol in frequency domain.

For example, a second reference signal sequence whose length is $M_{rs}$ (that is, including $M_{rs}$ elements) may be mapped onto the $M_{rs}$ subcarriers to obtain a frequency domain signal, and the transmit end sends a time domain signal, where the frequency domain signal may be converted into a time domain signal through inverse Fourier transform.

As described above, the second reference signal sequence set includes $N_{rs}$ second reference signal sequences, and the $N_{rs}$ second reference signal sequences may be sent on $N_{rs}$ symbols in time domain. The $N_{rs}$ second reference signal sequences are in a one-to-one correspondence with the $N_{rs}$ symbols, and each second reference signal sequence is mapped to a corresponding symbol.

Optionally, the $N_{rs}$ symbols are included in one resource unit, in other words, the transmit end sends second reference signal sequences on $N_{rs}$ symbols in one resource unit.

For example, one resource unit may be one RB or a plurality of RBs. The plurality of RBs may be continuously or discretely distributed. Pilot patterns of different RBs may be the same or different. This is not limited in this application. Without loss of generality, that one RB serves as one resource unit is used as an example below, unless otherwise specified.

Assuming that the resource unit includes N symbols and each symbol includes M subcarriers in frequency domain, $N \geq N_{rs}$, and $M \geq M_{rs}$, where both N and M are positive integers.

In an example, when $N > N_{rs}$ or $M > M_{rs}$ is met, no second reference signal sequence is mapped to idle subcarriers included in the resource unit, and the idle subcarriers may be used to carry data. Optionally, when data is sent by using an orthogonal frequency division multiplexing (OFDM) waveform, the data carried in the idle subcarriers is modulated data; or when data is sent by using a single-carrier frequency-division multiple access (SC-FDMA) waveform, the data carried in the idle subcarriers is output data obtained by performing Fourier transform on modulated data.

In a specific implementation, there may be a plurality of mapping manners for the second reference signal sequence on a time-frequency resource. An example is used for description below.

For example, the resource unit includes one slot in time domain, the slot includes N symbols, and each symbol includes M subcarriers in frequency domain. The $N_{rs}$ symbols used to carry second reference signal sequences are arranged at equal intervals based on a first value width in the N symbols of the slot. In addition, in each symbol, the $M_{rs}$ subcarriers used to carry a second reference signal sequence are arranged at equal intervals based on a second value width in the M subcarriers included in the symbol. The first value width $K_T$ meets the following formula: $K_T = N/N_{rs}$, and the second value width $K_F$ meets the following formula: $K_F = M/M_{rs}$, where $K_T$ and $K_F$ are positive integers.

The second reference signal sequences are configured to be arranged in a comb tooth form in time domain and in frequency domain, and a comb tooth size (for example, the first value width or the second value width) may be adjusted, so that density of reference signals (namely, second reference signal sequences) sent in one resource unit, that is, overheads of reference signals, can be flexibly adjusted, to meet requirements in different scenarios, for example, a low-speed scenario and a high-speed scenario.

In some embodiments, the $N_{rs}$ symbols are arranged at equal intervals based on the first value width in the N symbols, and/or the $M_{rs}$ subcarriers are arranged at equal intervals based on the second value width in the M subcarriers. That is, the second reference signal sequences may be arranged at equal intervals only in time domain, or may be arranged at equal intervals only in frequency domain, or may be arranged at equal intervals both in time domain and in frequency domain. In addition, the second reference signal sequences may be alternatively arranged at non-equal intervals both in time domain and in frequency domain. This is not limited.

FIG. 3 is used as an example for description below.

FIG. 3 shows an example of a mapping pattern of second reference signal sequences in one resource unit. As shown in FIG. 3, it is assumed that the resource unit includes one slot, the slot includes 14 symbols, that is, $N=14$, and one symbol includes 12 subcarriers, that is, $M=12$. A time domain position (also referred to as a time domain index) of a starting symbol of the 14 symbols is denoted as $t_{start}$, and a frequency domain position (also referred to as a frequency domain index) of a starting subcarrier of the 12 subcarriers is denoted as $k_{start}$. As shown in FIG. 3, a length $M_{rs}$ of the second reference signal sequence is 4, and a quantity $N_{rs}$ of second reference signal sequences is 7. The seven second reference signal sequences in the second reference signal sequence set are arranged at equal intervals based on the first value width $K_T$, which is 2, in the 14 symbols of the shown slot, and each second reference signal sequence is arranged at equal intervals based on the second value width $K_F$, which is 3, in a corresponding symbol.

As shown in FIG. 3, it is assumed that a time domain position set of the $N_{rs}$ second reference signal sequences is denoted as $t_{idx}$, and a frequency domain position set is denoted as $k_{idx}$.

In an implementation, a time domain position included in the time domain position set $t_{idx}$ may be a relative position relative to the time domain position $t_{start}$ of the starting symbol, and a frequency domain position included in the frequency domain position set $k_{idx}$ may be a relative position relative to the frequency domain position $k_{start}$ of the starting subcarrier. FIG. 3 is used as an example, where the time domain position set $t_{idx}$ is [0, 2, 4, 6, 8, 10, 12], and the frequency domain position set $k_{idx}$ is [0, 3, 6, 9].

In another implementation, a time domain position included in the time domain position set $t_{idx}$ may be an absolute position, and a frequency domain position included in the frequency domain position set $k_{idx}$ may also be an absolute position. FIG. 3 is still used as an example, where $t_{idx} = [t_{start}, t_{start}+2, t_{start}+4, t_{start}+6, t_{start}+8, t_{start}+10, t_{start}+12]$, and $k_{idx} = [k_{start}, k_{start}+3, k_{start}+6, k_{start}+9]$.

The foregoing resource unit may include one slot, and the slot includes $$N_{rep}^{symb} \times N_{base}^{symb}$$

symbols, where both $$N_{rep}^{symb} \text{ and } N_{base}^{symb}$$

are positive integers, and $$N_{base}^{symb}$$

may be known based on an agreement between the transmit end and the receive end.

$$N_{base}^{symb}$$

may be a minimum quantity of symbols included in one resource unit, and the receive end may notify the transmit end of $$N_{rep}^{symb}$$

through indication by using signaling.

For example, $$N_{rep}^{symb}$$

may have four values: 1, 2, 4, and 8. In this case, the receive end may perform indication to the transmit end by using 2-bit signaling. In another case, $$N_{rep}^{symb}$$

may be alternatively implicitly determined based on the first value width $K_T$ in the foregoing descriptions.

In addition, in an example, for different subcarrier spacings, one slot may include different quantities of symbols. At a specific subcarrier spacing, one slot may be configured, through indication by using signaling, to include different quantities of symbols, to adjust a quantity of symbols in time domain that are used to send reference signals, so as to flexibly adapt to requirements in different scenarios. For example, if a large capacity of reference signals is required, one slot may be configured, by using signaling, to include a larger quantity of symbols, so that a larger quantity of symbols are used to send reference signals, a value range of the time-domain cyclic shift factor $\alpha_T$ is larger, and a larger quantity of orthogonal multiplexing reference signals are supported.

For example, the resource unit includes a plurality of slots in time domain. For example, one resource unit may include $N_{slot}$ slots, where $N_{slot}$ is a positive integer, and the receive end may notify the transmit end of $N_{slot}$ through indication by using signaling. In this case, values of elements in the time domain position set $t_{idx}$ span a plurality of slots.

Figure 4:
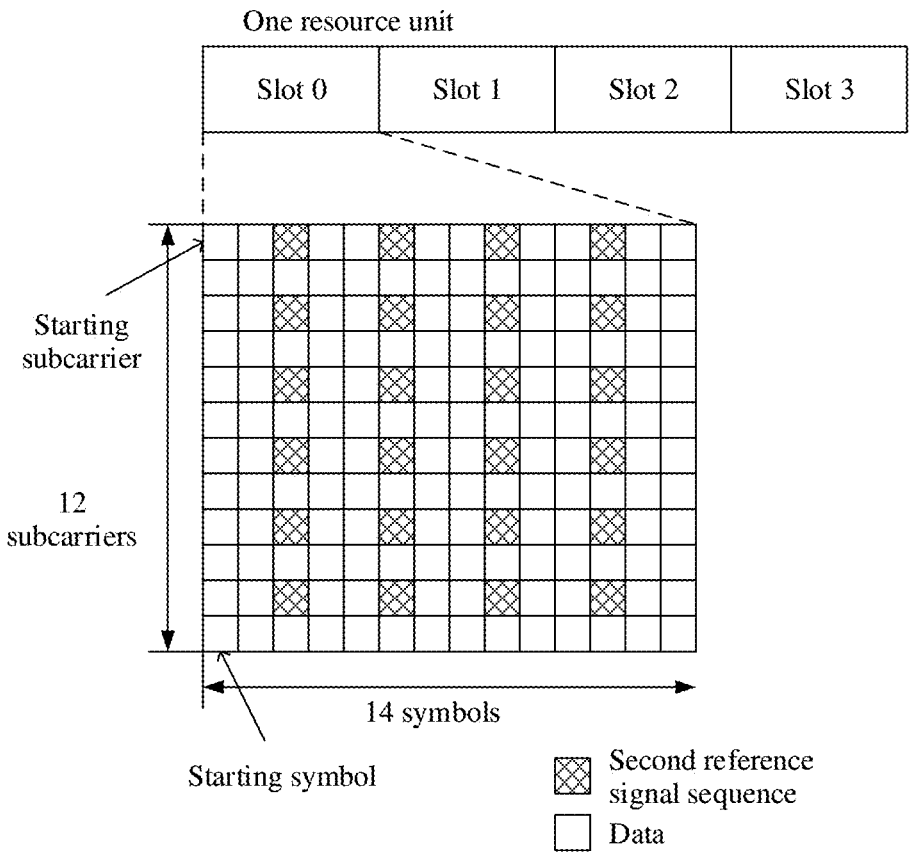
FIG. 4 shows an example of a mapping pattern of second reference signal sequences in one resource unit.

For example, one resource unit includes four slots, each slot includes 14 symbols, and symbols 2, 5, 8, and 11 of each slot are used to send second reference signal sequences, as shown in FIG. 4.

FIG. 4 shows an example of a mapping pattern of second reference signal sequences in one resource unit. It is assumed that an index of a time domain position of a starting symbol starts from 0, and symbols 2, 5, 8, and 11 of each slot are used to carry second reference signal sequences. A time domain position of a starting symbol of the four slots is $t_{start}$. It can be learned that time domain positions of all symbols of the four slots may be expressed as $t_{start}$, $t_{start}+1$, $t_{start}+2$, . . . , and $t_{start}+55$. In this case, the time domain position set $t_{idx}$ is expressed by using phase positions, and $t_{idx}=[2, 5, 8, 11, 16, 19, 22, 25, 30, 33, 36, 39, 44, 47, 50, 53]$.

For example, the resource unit includes a plurality of slots in time domain. When the $N_{rs}$ symbols are arranged at equal intervals based on the first value width in the N symbols, quantities and time domain positions of symbols, to which reference signal sequences are mapped, in different slots of the resource unit may be different.

For example, one resource unit includes four slots, each slot includes 14 symbols, and time domain positions of all symbols in the four slots may be expressed as $t_{start}$, $t_{start}+1$, $t_{start}$ 2, . . . , $t_{start}+55$. It is assumed that the $N_{rs}$ symbols corresponding to the $N_{rs}$ second reference signal sequences are arranged at equal intervals based on the first value width $K_T$, which is 3, in the N symbols, and a position of a symbol corresponding to a second reference signal sequence 0 in the N symbols is 2. In this case, it can be learned that $N_{rs}=18$. The time domain position set $t_{idx}$ is expressed by using relative positions. In this case, $t_{idx}=[2, 5, 8, 11, 14, 17, 20, 23, 26, 29, 32, 35, 38, 41, 44, 47, 50, 53]$. It can be learned that time domain positions of symbols, in a slot 0 (corresponding to relative positions 0 to 13) of the resource unit, for sending second reference signal sequences are 2, 5, 8, and 11; time domain positions of symbols, in a slot 1 (corresponding to relative positions 14 to 27), for sending second reference signal sequences are 14, 17, 20, 23, and 26; time domain positions of symbols, in a slot 2 (corresponding to relative positions 28 to 41), for sending second reference signal sequences are 29, 32, 35, 38, and 41; and time domain positions of symbols, in a slot 3 (corresponding to relative positions 42 to 55), for sending second reference signal sequences are 44, 47, 50, and 53.

For data sent in the resource unit, a possibility is that data generated by using to-be-sent bits corresponding to one transport block (TB) is sent in one slot, where the data may be generated by performing operations such as encoding, interleaving, rate matching, and modulation on the to-be-sent bits. In this case, the data generated by performing the operations such as encoding, interleaving, rate matching, and modulation on the to-be-sent bits is mapped to one slot for sending. Data sent in different slots may be a repetition of data sent in one slot. For example, redundancy versions (RV) of different slots may be the same or different. This is not limited.

When the resource unit includes a plurality of slots, a possibility is that data generated by using to-be-sent bits corresponding to one TB is sent in the plurality of slots, where the data may be generated by performing operations such as encoding, interleaving, rate matching, and modulation on the to-be-sent bits. In this case, the data generated by performing the operations such as encoding, interleaving, rate matching, and modulation on the to-be-sent bits is mapped to the plurality of slots for sending.

Optionally, in an example, time domain positions and frequency domain positions of the second reference signal sequences may be described in the following manner.

The second reference signal sequences are mapped to $M_{rs}$ subcarriers, where frequency domain positions corresponding to the $M_{rs}$ subcarriers are included in a frequency domain position set $k_{idx}$, and a frequency domain position corresponding to a subcarrier to which an element m, namely, $r_{2,t}(m)$, of a second reference signal sequence t, namely, $r_{2,t}$, in the second reference signal sequence set is mapped is $k_{idx}(m)$.

$N_{rs}$ second reference signal sequences in the second reference signal sequence set are sent on $N_{rs}$ symbols, the $N_{rs}$ symbols are included in N symbols of a resource unit, and a set including time domain positions corresponding to the $N_{rs}$ symbols is denoted as a time domain position set $t_{idx}$. In this case, a time domain position of a symbol corresponding to the second reference signal sequence t, namely, $r_{2,t}$, is $t_{idx}(t)$.

Optionally, the frequency domain positions of the second reference signal sequences may be continuous, where in this case, $M_{rs}=M$; or may be discrete. Optionally, the time domain positions of the second reference signal sequences may be continuous, where in this case, $N_{rs}=N$; or may be discrete.

Figure 5:
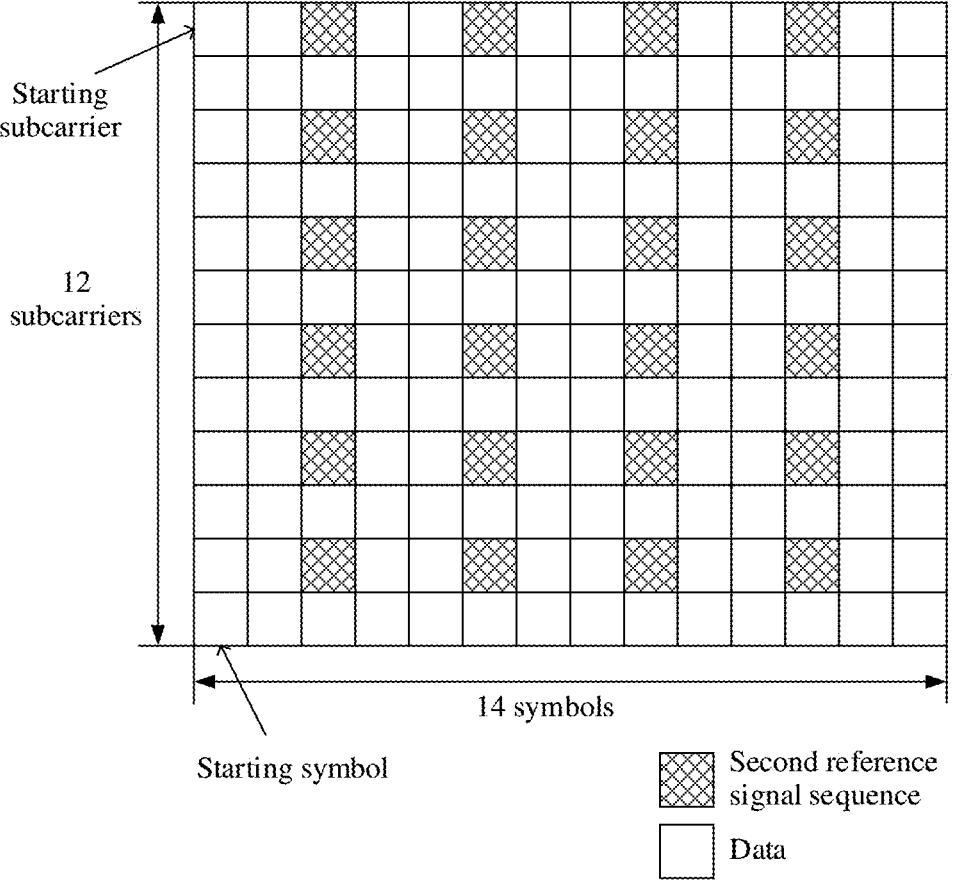
FIG. 5 shows an example of a mapping pattern of second reference signal sequences in one resource unit.

For example, one resource unit may include one slot, one slot includes 14 (N=14) symbols, time domain indexes of the 14 symbols are denoted as 0 to 13, and a quantity $N_{rs}$ of second reference signal sequences is 4. In this case, time domain indexes, in the 14 symbols included in the slot, of the four symbols for carrying the second reference signal sequences may be 2, 5, 8, and 11, that is, $t_{idx}=[2, 5, 8, 11]$. In addition, frequency domain indexes may be 0, 2, 4, 6, 8, and 10, that is, $k_{idx}=[0, 2, 4, 6, 8, 10]$. FIG. 5 shows an example of a mapping pattern of second reference signal sequences in one resource unit.

The foregoing describes implementations of performing, by the transmit end, phase rotation on the first reference signal sequence by using the frequency-domain cyclic shift factor $\alpha_F$ and the time-domain cyclic shift factor $\alpha_T$, to obtain the second reference signal sequence, and sending, by the transmit end, the second reference signal sequence in this application.

With reference to FIG. 6, the following describes a process of sending a reference signal sequence and receiving the reference signal sequence in an embodiment of this application.

FIG. 6 shows an example of a flowchart of sending and receiving a second reference signal sequence.

610: A transmit end obtains a frequency-domain cyclic shift factor $\alpha_F$, and a time-domain cyclic shift factor $\alpha_T$.

Optionally, if second reference signal sequences are distributed on a time-frequency resource in the comb tooth pattern shown in FIG. 3, in step 610, the transmit end further needs to obtain information such as a first value width and a second value width.

A receive end may notify the transmit end of all of the foregoing information by using signaling, or some information may be predefined.

620: The transmit end generates a second reference signal sequence based on the obtained information and a first reference signal sequence.

In addition, the transmit end generates data.

630: The transmit end maps the second reference signal sequence and the data to a corresponding time-frequency resource.

640: The transmit end sends the second reference signal sequence and the data on an antenna port p.

The receive end receives the second reference signal and the data from the antenna port p of the transmit end.

650: The receive end performs channel estimation by using the received second reference signal sequence, to obtain a channel response.

It should be noted that, if a plurality of transmit ends send data to the receive end through MIMO, in a channel estimation process, the receive end distinguishes between channel responses of different transmit ends based on the fact that frequency-domain cyclic shift factors $\alpha_F$, and time-domain cyclic shift factors $\alpha_T$ of the different transmit ends are orthogonal.

Alternatively, if a transmit end sends data to the receive end by using a plurality of antenna ports through MIMO, in a channel estimation process, the receive end distinguishes between channel responses of different antenna ports based on the fact that frequency-domain cyclic shift factors $\alpha_F$, and time-domain cyclic shift factors $\alpha_T$ corresponding to the antenna ports used by the transmit end are orthogonal.

Second reference signal sequences sent by the transmit end on $N_{rs}$ symbols are known to the receive end. The receive end performs channel estimation based on second reference signal sequences actually received on $N_{rs}$ symbols and the known second reference signal sequences, to obtain a frequency domain channel response of the $N_{rs}$ symbols. In the following descriptions, a frequency domain channel response of each of the $N_{rs}$ symbols is denoted as $H_t$, where $0 \leq t < N_{rs}$, and $H_t$ includes $M_{rs}$ elements.

The receive end performs inverse Fourier transform on the frequency domain channel response $H_t$ of each symbol to obtain an output $h_t$, and performs Fourier transform on elements with a same index in outputs $h_t$ of different symbols to obtain a channel response $$h_t^{DD}$$

in delay-Doppler domain, where elements m in the outputs $h_t$ of the different symbols may be denoted as $h_t(m)$. It is assumed that $$h_t^{DD}(m) = h_{matrix}(t, m),$$

where $0 \leq m < M_{rs}$, and $0 \leq t < N_{rs}$. It can be learned that $h_{matrix}(t,m)$ is a matrix whose size is $N_{rs} \times M_{rs}$, and includes $N_{rs} \times M_{rs}$ elements.

According to an aggregation characteristic of a time domain channel response, an amplitude of the time domain channel response is high within a period of time in time domain, and an amplitude beyond this period of time is quite low, and may be basically ignored. Likewise, a channel response also has an aggregation characteristic in delay-Doppler domain. To be specific, amplitudes of elements in some regions of a channel response $h_{matrix}(t,m)$ in delay-Doppler domain are high, and amplitudes of elements in other regions are quite low, and may be basically ignored.

Therefore, for different values of the frequency-domain cyclic shift factor $\alpha_F$ and the time-domain cyclic shift factor $\alpha_T$, regions in which channel responses are aggregated in delay-Doppler domain are different. That is, for different transmit ends, different values of the frequency-domain cyclic shift factor $\alpha_F$ and the time-domain cyclic shift factor $\alpha_T$, are configured, so that channel responses of the different transmit ends in delay-Doppler domain are aggregated in different regions. For each transmit end, an aggregation region of a channel response of each transmit end in $h_{matrix}$ (t,m) is determined based on values of the frequency-domain cyclic shift factor $\alpha_F$ and the time-domain cyclic shift factor $\alpha_T$ of each transmit end, and then the receive end extracts the channel response of each transmit end by performing an operation such as filtering or windowing. The channel response of each transmit end is not affected by a channel response of another transmit end.

After obtaining the channel response $h_{matrix}$(t,m) in delay-Doppler domain, the receive end obtains a processed channel response $$h_{matrix}^{filter}(t, m)$$

by performing an operation such as filtering or windowing. The receive end performs inverse Fourier transform on elements with a same index (for example, elements m of different symbols) in $$h_{matrix}^{filter}(t, m)$$

corresponding to different symbols t, and then performs Fourier transform on an output result of each symbol in an output result of the inverse Fourier transform, to obtain a new frequency domain channel response $$H_t^{filter}$$

of each symbol.

Finally, the receive end may obtain a frequency domain channel response of the other $(N–N_{rs})$ symbols through interpolation by using the new frequency domain channel response $$H_t^{filter}$$

of the $N_{rs}$ symbols, and then perform, by using the frequency domain channel response obtained through interpolation, operations such as equalization, demodulation, and decoding on data received from the transmit end, to obtain data sent by the transmit end, as described in step 660.

660: The receive end performs, by using the channel response, processing such as equalization, demodulation, and decoding on data received from the transmit end, to obtain data sent by the transmit end.

In the foregoing embodiment, the transmit end sends the second reference signal sequence on the antenna port p, where the antenna port $p \in \{0, 1, P–1\}$, and P is an integer greater than or equal to 1. That is, the transmit end may send the second reference signal sequence by using some or all of the P antenna ports.

Each of the P antenna ports uniquely corresponds to a combination of one value of $\alpha_F$ and one value of $\alpha_T$. When a value, corresponding to each of the P antenna ports, of $\alpha_F$, is determined, a value, corresponding to the antenna port, of $\alpha_T$ is also uniquely determined. In other words, when a value, corresponding to each of the P antenna ports, of $\alpha_T$ is determined, a value, corresponding to the antenna port, of $\alpha_F$ is also uniquely determined. Combinations, corresponding to any two of the P antenna ports, of values of $\alpha_F$ and values of $\alpha_T$ are different.

It should be understood that, that combinations, corresponding to any two antenna ports, of values of $\alpha_F$ and values of $\alpha_F$ are different indicates that any two antenna ports correspond to at least one of different values of $\alpha_F$ and different values of $\alpha_T$. For example, values of $\alpha_F$ are different, and values of $\alpha_T$ are the same; or values of $\alpha_F$ are the same, and values of $\alpha_T$ are different; or values of $\alpha_F$ are different, and values of $\alpha_T$ are also different.

It can be understood that different values of $$\alpha_F^p \text{ and } \alpha_T^p$$

may be used for different antenna ports, and values of $$\alpha_F^p \text{ and } \alpha_T^p$$

of different antenna ports may be flexibly configured, to implement orthogonal multiplexing of reference signals between antenna ports, thereby increasing a quantity of antenna ports that can be supported.

Based on a one-to-one mapping relationship between the P antenna ports and the frequency-domain cyclic shift factor $\alpha_F$ and the time-domain cyclic shift factor $\alpha_T$, for a process of generating the second reference signal sequence sent on the antenna port p, refer to the following descriptions:

The transmit end determines the first reference signal sequence, and performs phase rotation on the first reference signal sequence by using a frequency-domain cyclic shift factor $\alpha_F$ and a time-domain cyclic shift factor $\alpha_T$, that correspond to the antenna port p, to obtain the second reference signal sequence of the antenna port p.

The second reference signal sequence of the antenna port p belongs to a second reference signal sequence set $$r_2^p$$

corresponding to the antenna port p, and the second reference signal sequence t in the second reference signal sequence set $$r_2^p$$

may be generated by using a formula (12):

$$r_{2,t}^p(m) = r_1^p(m) \times e^{j\alpha_F^p m} \times e^{j\alpha_F^p t},$$

where $$r_1^p(m)$$

27 28 indicates an element m of the first reference signal sequence corresponding to the antenna port p, $$r_{2,t}^{p}(m)$$

indicates an element m of the second reference signal sequence t corresponding to the antenna port p, and P is a quantity of antenna ports.

Optionally, in an example, first reference signal sequences corresponding to two different antenna ports of the P antenna ports may be the same, and may be expressed as $$r_1^p.$$

In this case, the second reference signal sequence is generated based on the foregoing formula (12).

In another example, first reference signal sequences corresponding to two different antenna ports of the P antenna ports are different. In this case, the first reference signal sequence corresponding to the antenna port p belongs to a first reference signal sequence set $r_1^P$ corresponding to the antenna port p. In this case, the second reference signal sequence is generated based on the following formula (13):

$$r_{2,t}^{p}(m) = r_{1,t}^{p}(m) \times e^{j\alpha_F^p m} \times e^{j\alpha_F^p t},$$

where $$r_{1,t}^{p}(m)$$

indicates an element m of a first reference signal sequence t corresponding to the antenna port p, $$r_{2,t}^{p}(m)$$

indicates an element m of the second reference signal sequence t corresponding to the antenna port p, and P is a quantity of antenna ports.

For a manner of generating the first reference signal sequence in the foregoing formula (12) or formula (13), refer to the foregoing descriptions. Details are not described again.

In addition, in another embodiment, the transmit end generates a second reference signal sequence $r_{2,t}$ by using the foregoing formula (5), and then performs phase rotation on the second reference signal sequence by using the frequency-domain cyclic shift factor (denoted as $$\alpha_F^p)$$

and the time-domain cyclic shift factor (denoted as $$\alpha_T^p)$$

that correspond to the antenna port p, to obtain a second reference signal sequence $$r_{2,t}^{p}$$

of the antenna port p.

The second reference signal sequence of the antenna port p belongs to the second reference signal sequence set $$r_2^p$$

corresponding to the antenna port p. The second reference signal sequence t, namely, $$r_{2,t}^{p},$$

of the antenna port p in $$r_2^p$$

may be generated based on the following formulas (14) and (15):

$$r_{2,t}^{p}(m) = r_{2,t}(m) \times e^{j\alpha_F^p m} \times e^{j\alpha_F^p t},$$

It can be learned according to the formula (5) that the formula (14) may be further expanded to obtain the formula (15):

$$r_{2,t}^{p}(m) = r_{1,t}(m) \times e^{j\alpha_F m} \times e^{j\alpha_T t} \times e^{j\alpha_F^p m} \times e^{j\alpha_T^p t},$$

where $$r_{2,t}^{p}(m)$$

indicates an element m of $$r_{2,t}^{p}. \text{ For } r_{1,t}(m), \alpha_F^p, \text{ and } \alpha_T^p,$$

refer to the descriptions of $$r_{1,t}(m),$$

$\alpha_F$, and $\alpha_T$ in the formula (5) respectively.

In this embodiment, the frequency-domain cyclic shift factor $\alpha_F$ and $\alpha_T$ the time-domain cyclic shift factor $\alpha_T$ may be configured at a cell level, and values of $\alpha_F$ and $\alpha_T$ of different cells may be configured to be different, to reduce mutual interference between data sent by transmit ends of different cells, and alleviate inter-cell interference.

After obtaining the second reference signal sequence of the antenna port p in the foregoing manner, the transmit end sends the second reference signal sequence to the receive end. Time domain positions and frequency domain positions of second reference signal sequences of the P antenna ports may be the same or different. This is not limited.

In addition, in the foregoing embodiment related to the antenna port p, the frequency-domain cyclic shift factor corresponding to the antenna port p is denoted as $$\alpha_F^p,$$

and the time-domain cyclic shift factor corresponding to the antenna port p is denoted as $$\alpha_T^p.$$

$$\alpha_F^p \text{ and } \alpha_T^p$$

may be respectively determined by using the following formulas:

$$\alpha_F^p = \pm \frac{2\pi}{N_F^p} \times \beta_F^p, \tag{16}$$

where $N_F^p$ is an integer, $\beta_F^p$ is an integer, and a value range of $\beta_F^p$ is [0, $N_F^p-1$]; and $$\alpha_T^p = \pm \frac{2\pi}{N_T^p} \times \beta_T^p, \tag{17}$$

where $$N_T^p$$

is an integer, $$\beta_T^p$$

is an integer, and a value range of $$\beta_T^p \text{ is } [0, N_T^p - 1].$$

Optionally, in an implementation, $$N_F^p$$

corresponding to different antenna ports of the P antenna ports may be the same. In this case, $$N_F^p$$

may be denoted as $N_F$. Alternatively, $$N_F^p$$

corresponding to different antenna ports may be different. Likewise, $$N_T^p$$

corresponding to different antenna ports of the P antenna ports may be the same. In this case, $$N_T^p$$

may be denoted as $N_T$. Alternatively, $$N_T^p$$

corresponding to different antenna ports may be different. For example, values of $$\alpha_F^p, N_F^p, \text{ and } \beta_F^p$$

are the same as the values of $\alpha_F$, $N_F$, and $\beta_F$ defined in the foregoing formula (7). Likewise, values of $$\alpha_T^p, N_T^p, \text{ and } \beta_T^p$$

may be alternatively the same as the values of $\alpha_T$, $N_T$, and $\beta_T$ defined in the foregoing formula (8).

For example, values of $$\alpha_F^p \text{ and } \alpha_T^p$$

may be alternatively the same as the values of $\alpha_F$ and $\alpha_T$ listed in Table 1 to Table 3.

Different values of $$\alpha_F^p \text{ and } \alpha_T^p$$

are configured for different antenna ports, so that orthogonal multiplexing of reference signals between antenna ports can be implemented, and a quantity of antenna ports that can be supported can be increased. Therefore, values of $$\alpha_F^p \text{ and } \alpha_T^p$$

of different antenna ports can be flexibly configured.

As described above, each of the P antenna ports uniquely corresponds to a combination of one value of the frequency-domain cyclic shift factor and one value of the time-domain cyclic shift factor, and different antenna ports correspond to at least one of different values of $\alpha_F{}^p$ and different values of $$\alpha_T^p.$$

For example, $$\alpha_F^p = \frac{2\pi}{N_F} \times \beta_F^p, \text{ and } \alpha_T^p = \frac{2\pi}{N_T} \times \beta_T^p.$$

has $N_F$ different values, and $$\beta_T^p$$

has $N_T$ different values. Therefore, a maximum quantity of antenna ports that can be supported is $P=N_F \times N_T$.

A relationship between $$\beta_F^p \text{ and } \beta_T^p$$

and the antenna port p may be determined in the following manner.

For example, $$\beta_F^p \text{ and } \beta_T^p$$

are determined by using the following formulas (18) and (19) respectively:

$$\beta_F^p = \left( \left\lfloor \frac{p}{N_T} \right\rfloor + \Delta_F \right) \bmod N_F \tag{18}$$

$$\beta_T^p = (p + \Delta_T) \bmod N_T, \tag{19}$$

where
  mod indicates a modulo operation, a value of p is any integer ranging from 0 to P−1, and $\Delta_F$ and $\Delta_T$ are predefined integers, for example, $\Delta_F=0$, or $\Delta_F=\lfloor N_F/2 \rfloor$, and $\Delta_T=0$, or $\Delta_T=\lfloor N_T/2 \rfloor$.

For example, $\beta_F{}^p$ and $\beta_T{}^p$ may be alternatively determined by using the following formulas (20) and (21) respectively:

$$\beta_F^p = (p + \Delta_F) \bmod N_F \tag{20}$$

$$\beta_T^p = \left( \left\lfloor \frac{p}{N_F} \right\rfloor + \Delta_T \right) \bmod N_T, \tag{21}$$

where
  mod indicates a modulo operation, and a value of p is any integer ranging from 0 to P−1. In an example, $N_F=4$, $N_T=2$, $\Delta_F=0$, and $\Delta_T=0$. In this case, $$\alpha_F^p \text{ and } \alpha_T^p$$

are shown in formulas (22) and (23) respectively:

$$\alpha_F^p = \frac{2\pi}{N_F} \times \beta_F^p = \frac{2\pi}{4} \times (\lfloor p/2 \rfloor \bmod 4) \tag{22}$$

$$\alpha_T^p = \frac{2\pi}{N_T} \times \beta_T^p = \frac{2\pi}{2} \times (p \bmod 2) \tag{23}$$

For example, a correspondence between the antenna port p and a value of $$\alpha_F^p$$

and a value of $$\alpha_T^p$$

may be alternatively expressed by using a table. For ease of description, in the following example, assuming that $$N_F^p$$

corresponding to different antenna ports of the P antenna ports is the same, $$N_F^p$$

may be denoted as $N_F$ in this case; and assuming that $$N_T^p$$

corresponding to different antenna ports of the P antenna ports is the same, $$N_T^p$$

may be denoted as $N_T$ in this case.
For example, in an example, $$\alpha_F^p$$

has four different values: 1, $$\frac{\pi}{2},$$

$\pi$, and $$\frac{3\pi}{2};$$

and $\alpha_T^p$ has two different values: 1 and $\pi$. Therefore, eight antenna ports can be supported, and the correspondence between the antenna port p and the value of $$\alpha_F^p$$

and the value of $$\alpha_T^p$$

may be shown in Table 8, where $p \in \{0, 1, \ldots, 7\}$.

TABLE 8

| p | $\alpha_F^p$ | $\alpha_T^p$ |
|---|---|---|
| 0 | 1 | 1 |
| 1 | 1 | $\pi$ |
| 2 | $\pi$ | 1 |
| 3 | $\pi$ | $\pi$ |
| 4 | $\frac{\pi}{2}$ | 1 |
| 5 | $\frac{\pi}{2}$ | $\pi$ |
| 6 | $\frac{3\pi}{2}$ | 1 |
| 7 | $\frac{3\pi}{2}$ | $\pi$ |

In another example, $$\alpha_F^p$$

has four different values: 1, $$\frac{\pi}{2},$$

$\pi$, and $$\frac{3\pi}{2};$$

and $\alpha_T^p$ has three different values: 1, $$\frac{2\pi}{3}, \text{ and } \frac{4\pi}{3}.$$

Therefore, 12 antenna ports can be supported, and the correspondence between the antenna port p and the value of $$\alpha_F^p$$

and the value of $$\alpha_T^p$$

may be shown in Table 9, where $p \in \{0, 1, \ldots, 11\}$.

TABLE 9

| p | $\alpha_F^p$ | $\alpha_T^p$ |
|---|---|---|
| 0 | 1 | 1 |
| 1 | 1 | $\frac{2\pi}{3}$ |
| 2 | 1 | $\frac{4\pi}{3}$ |
| 3 | $\pi$ | 1 |
| 4 | $\pi$ | $\frac{2\pi}{3}$ |
| 5 | $\pi$ | $\frac{4\pi}{3}$ |
| 6 | $\frac{\pi}{2}$ | 1 |
| 7 | $\frac{\pi}{2}$ | $\frac{2\pi}{3}$ |
| 8 | $\frac{\pi}{2}$ | $\frac{4\pi}{3}$ |
| 9 | $\frac{3\pi}{2}$ | 1 |
| 10 | $\frac{3\pi}{2}$ | $\frac{2\pi}{3}$ |
| 11 | $\frac{3\pi}{2}$ | $\frac{4\pi}{3}$ |

In another example, $$\alpha_F^p$$

has four different values: 1, $$\frac{\pi}{2},$$

$\pi$, and $$\frac{3\pi}{2};$$

and $$\alpha_T^p$$

has four different values: 1, $$\frac{\pi}{2},$$

$\pi$, and $$\frac{3\pi}{2}.$$

Therefore, 16 antenna ports can be supported, and the correspondence between the antenna port p and the value of $$\alpha_F^p$$

and the value of $$\alpha_T^p$$

may be shown in Table 10, where $p \in \{0, 1, \ldots, 15\}$.

TABLE 10

| p | $\alpha_F^p$ | $\alpha_T^p$ |
|---|---|---|
| 0 | 1 | 1 |
| 1 | 1 | $\pi$ |
| 2 | $\pi$ | 1 |
| 3 | $\pi$ | $\pi$ |
| 4 | $\frac{\pi}{2}$ | 1 |
| 5 | $\frac{\pi}{2}$ | $\pi$ |
| 6 | $\frac{3\pi}{2}$ | 1 |
| 7 | $\frac{3\pi}{2}$ | $\pi$ |
| 8 | 1 | $\frac{\pi}{2}$ |
| 9 | 1 | $\frac{3\pi}{2}$ |
| 10 | $\pi$ | $\frac{\pi}{2}$ |
| 11 | $\pi$ | $\frac{3\pi}{2}$ |

TABLE 10-continued

| p | $\alpha_F^p$ | $\alpha_T^p$ |
|---|---|---|
| 12 | $\frac{\pi}{2}$ | $\frac{\pi}{2}$ |
| 13 | $\frac{\pi}{2}$ | $\frac{3\pi}{2}$ |
| 14 | $\frac{3\pi}{2}$ | $\frac{\pi}{2}$ |
| 15 | $\frac{3\pi}{2}$ | $\frac{3\pi}{2}$ |

It can be learned from Table 8 to Table 10 that the antenna port p is in a one-to-one correspondence with the values of $$\alpha_F^p \text{ and } \alpha_T^p,$$

and different antenna ports correspond to at least one of different values of $$\alpha_F^p$$

and different values of $$\alpha_T^p,$$

so that a quantity of signaling bits can be reduced, and signaling overheads can be reduced.

In addition, it can be learned that the value of $$\alpha_F^p$$

is in a one-to-one correspondence with the value of $$\beta_F^p,$$

and the value of $$\alpha_T^p$$

is in a one-to-one correspondence with the value of $$\beta_T^p.$$

Provided that the values of $$\beta_F^p \text{ and } \beta_T^p$$

are determined, the values of $$\alpha_F^p \text{ and } \alpha_T^p$$

can be determined. Therefore, each of the P antenna ports may also uniquely correspond to a combination of one value of $$\beta_F^p$$

and one value of $$\beta_T^p,$$

and different antenna ports correspond to at least one of different values of $$\beta_F^p$$

and different values of $$\beta_T^p.$$

A correspondence between the antenna port p and a value of $$\beta_F^p$$

and a value of $$\beta_T^p$$

may be alternatively expressed by using a table.

For example, in an example, the value of $N_F$ is 4, $$\beta_F^p$$

has four different values: 0, 1, 2, and 3; and the value of $N_T$ is 2, and $$\beta_T^p$$

has two different values: 0 and 1. Therefore, eight antenna ports can be supported, and the correspondence between the antenna port p and the value of $$\beta_F^p$$

and the value of $$\beta_T^p$$

may be shown in Table 11, where $p \in \{0, 1, \ldots, 7\}$.

TABLE 11

| p | $\beta_F^p$ | $\beta_T^p$ |
|---|---|---|
| 0 | 0 | 0 |
| 1 | 0 | 1 |
| 2 | 2 | 0 |
| 3 | 2 | 1 |
| 4 | 1 | 0 |
| 5 | 1 | 1 |
| 6 | 3 | 0 |
| 7 | 3 | 1 |

In another example, the value of $N_F$ is 4, $$\beta_F^p$$

has four different values: 0, 1, 2, and 3; and the value of $N_T$ is 3, and $$\beta_T^p$$

has three different values: 0, 1, and 2. Therefore, 12 antenna ports can be supported, and the correspondence between the antenna port p and the value of $$\beta_F^p$$

and the value of $$\beta_T^p$$

may be shown in Table 12, where $p \in \{0, 1, \ldots, 11\}$.

TABLE 12

| p | $\beta_F^p$ | $\beta_T^p$ |
|---|---|---|
| 0 | 0 | 0 |
| 1 | 0 | 1 |
| 2 | 0 | 2 |
| 3 | 2 | 0 |
| 4 | 2 | 1 |
| 5 | 2 | 2 |
| 6 | 1 | 0 |
| 7 | 1 | 1 |
| 8 | 1 | 2 |
| 9 | 3 | 0 |
| 10 | 3 | 1 |
| 11 | 3 | 2 |

In another example, the value of $N_F$ is 4, $$\beta_F^p$$

has four different values: 0, 1, 2, and 3; and the value of $N_T$ is 4, and $$\beta_T^p$$

has four different values: 0, 1, 2, and 3. Therefore, 16 antenna ports can be supported, and the correspondence between the antenna port p and the value of $$\beta_F^p$$

and the value of $$\beta_T^p$$

may be shown in Table 13, where $p \in \{0, 1, \ldots, 15\}$.

TABLE 13

| p | $\beta_F^p$ | $\beta_T^p$ |
|---|---|---|
| 0 | 0 | 0 |
| 1 | 0 | 2 |
| 2 | 2 | 0 |
| 3 | 2 | 2 |
| 4 | 1 | 0 |
| 5 | 1 | 2 |
| 6 | 3 | 0 |
| 7 | 3 | 2 |
| 8 | 0 | 1 |
| 9 | 0 | 3 |
| 10 | 2 | 1 |
| 11 | 2 | 3 |
| 12 | 1 | 1 |
| 13 | 1 | 3 |
| 14 | 3 | 1 |
| 15 | 3 | 3 |

After the values of $$\beta_F^p \text{ and } \beta_T^p$$

are determined based on the table, the values of $$\alpha_F^p \text{ and } \alpha_T^p$$

may be determined by using the formulas (16) and (17). It can be learned that the values of $$e^{j \cdot \alpha_F^p \cdot m} \text{ and } e^{j \cdot \alpha_T^p \cdot t}$$

may be determined based on the values of $$\alpha_F^p \text{ and } \alpha_T^p.$$

For example, when the value of $$\alpha_F^p \text{ is } \pi/2,$$

based on different values of m, $$e^{j \cdot \alpha_F^p \cdot m}$$

is obtained by repeating a sequence $[1, j, -1, -j]$.

$$e^{j \cdot \alpha_F^p \cdot m}$$

has $N_T$ possible values, and $$e^{j \cdot \alpha_T^p \cdot t}$$

Therefore, an element 0 to an element $N_F - 1$ in $$e^{j \cdot \alpha_F^p \cdot m}$$

corresponding to the antenna port p may be expressed as a sequence $$W_F^p$$

whose length is $N_F$, and an element 0 to an element $N_T - 1$ in $$e^{j \cdot \alpha_T^p \cdot t}$$

may be expressed as a sequence $$W_T^p$$

whose length is $N_T$. In this case, $$e^{j \cdot \alpha_F^p \cdot m} \text{ and } e^{j \cdot \alpha_T^p \cdot t}$$

may be expressed as follows:

$$e^{j \cdot \alpha_F^p \cdot m} = W_F^p(m \bmod N_F), \ 0 \le m < M_{rs} \quad (24)$$

$$e^{j \cdot \alpha_T^p \cdot t} = W_T^p(t \bmod N_T), \ 0 \le t < N_{rs} \quad (25)$$

Therefore, $$e^{j\cdot\alpha_F^p\cdot m} \text{ and } e^{j\cdot\alpha_T^p\cdot t}$$

may be further determined based on a one-to-one correspondence between values indicated by signaling and the sequence $W_F^p$ and the sequence $W_T^p$. Optionally, the one-to-one mapping relationship may be expressed by using a table.

An element $N_T$ of the sequence $$W_T^p$$

may be expressed as $$[W_T^p(0), W_T^p(1), W_T^p(2), W_T^p(3)].$$

In an example for description, a determining manner is shown in Table 14.

TABLE 14

| p | $[W_F^p(0),\ W_F^p(1),\ W_F^p(2),\ W_F^p(3)]$ | $[W_T^p(0),\ W_T^p(1),\ W_T^p(2),\ W_T^p(3)]$ |
|---|---|---|
| 0 | [1, 1, 1, 1] | [1, 1, 1, 1] |
| 1 | [1, 1, 1, 1] | [1,−1, 1, −1] |
| 2 | [1,−1, 1, −1] | [1, 1, 1, 1] |
| 3 | [1,−1,1,−1] | [1, −1, 1,−1] |
| 4 | [1, j, −1, −j] | [1, 1, 1, 1] |
| 5 | [1, j, −1, −j] | [1, −1, 1, −1] |
| 6 | [1, −j, −1, j] | [1, 1, 1, 1] |
| 7 | [1,−j,−1, j] | [1, −1, 1, −1] |
| 8 | [1, 1, 1, 1] | [1, j, −1, −j] |
| 9 | [1, 1, 1, 1] | [1, −j, −1, j] |
| 10 | [1,−1, 1, −1] | [1, j, −1, −j] |
| 11 | [1,−1,1,−1] | [1, −j, −1, j] |
| 12 | [1, j, −1, −j] | [1, j, −1, −j] |
| 13 | [1, j, −1, −j] | [1, −j, −1, j] |
| 14 | [1,−j,−1, j] | [1, j, −1, −j] |
| 15 | [1, −j, −1, j] | [1,−j, −1, j] |

For example, it is assumed that the value of $N_F$ is 4 and the value of $N_T$ is 4. In this case, values of the sequence $$W_F^p$$

and the sequence $$W_T^p$$

may be determined by using 4-bit signaling, and further, the values of $$e^{j\cdot\alpha_F^p\cdot m} \text{ and } e^{j\cdot\alpha_T^p\cdot t}$$

may be determined. An element $N_F$ of the sequence $$W_F^p$$

may be expressed as $$[W_F^p(0), W_F^p(1), W_F^p(2), W_F^p(3)].$$

Optionally, in an embodiment, the values of the antenna port p in the foregoing tables may be indicated by using DCI.

It can be learned from the foregoing embodiment that different values of $\alpha_F^p$ and $\alpha_T^p$ are used for different antenna ports, so that orthogonal multiplexing of reference signal sequences between the different antenna ports can be implemented, thereby increasing a quantity of antenna ports that can be supported.

In the foregoing embodiment related to the antenna port, $N_{rs}$ second reference signal sequences sent by different antenna ports are mapped to same time domain positions and frequency domain positions. In some other embodiments, $N_{rs}$ second reference signal sequences sent by different antenna ports may be mapped to different time domain positions and/or frequency domain positions. Descriptions are provided below.

Frequency domain positions to which $N_{rs}$ second reference signal sequences sent by the antenna port p are mapped are included in a frequency domain position set $$k_{idx}^p,$$

where a frequency domain position corresponding to a subcarrier to which an element m, namely, $r_{2,t}(m)$, of a second reference signal sequence t, namely, $r_{2,t}$, is mapped is $$k_{idx}^p(m), \text{ and } k_{idx}^p$$

includes $M_{rs}$ elements.

Time domain positions to which the $N_{rs}$ second reference signal sequences sent by the antenna port p are mapped are included in a time domain position set $$t_{idx}^p,$$

where a time domain position of a symbol corresponding to the second reference signal sequence t, namely, $r_{2,t}$, is $$t_{idx}^p(t),$$

and $$t_{idx}^p$$

includes $N_{rs}$ elements.

The frequency domain position set $$k_{idx}^p$$

is an element in a first frequency domain position set $K_{idx}$, and the time domain position set $$t_{idx}^p$$

is an element in a first time domain position set $T_{idx}$. Any two elements in the first frequency domain position set are different, and any two elements in the first time domain position set are different.

A quantity of elements in the first frequency domain position set $K_{idx}$ is $N_{idx,K}$, where $N_{idx,K}$ is a positive integer. An element i in the first frequency domain position set $K_{idx}$, may be denoted as $$K_{idx}^i,$$

and the element i, namely, $$K_{idx}^i,$$

includes $M_{rs}$ values, where a value range of i is $[0, N_{idx,K}-1]$. That any two elements in the first frequency domain position set are different indicates that values m of any two elements are different, that is, when i and j are different, $$K_{idx}^i(m) \text{ and } K_{idx}^j(m)$$

are different, where $i \in [0, N_{idx,K}-1]$, $j \in [0, N_{idx,K}-1]$, and a value range of m is $[0, M_{rs}-1]$.

A quantity of elements in the first time domain position set $T_{idx}$ is $N_{idx,T}$, where $N_{idx,T}$ is a positive integer. An element i in the first time domain position set $T_{idx}$ may be denoted as $$T_{idx}^i,$$

and the element i, namely, $$T_{idx}^i,$$

includes $N_{rs}$ values. That any two elements in the first time domain position set are different indicates that values m of any two elements are different, that is, when i and j are different, $$T_{idx}^i(m) \text{ and } T_{idx}^j(m)$$

are different, where $i \in [0, N_{idx,T}-1]$, $j \in [0, N_{idx,T}-1]$, and a value range of m is $[0, N_{rs}-1]$.

Frequency domain positions to which $N_{rs}$ second reference signal sequences of different antenna ports are mapped may be different, that is, may be different elements in the first frequency domain position set $K_{idx}$. For example, the first frequency domain position set $K_{idx}$ includes two elements, that is, $N_{idx,K}=2$. In this case, frequency domain positions to which $N_{rs}$ second reference signal sequences of an antenna port $p_0$ are mapped, that is, a frequency domain position set $$k_{idx}^0, \text{ may be } K_{idx}^0;$$

and frequency domain positions to which $N_{rs}$ second reference signal sequences of an antenna port $p_1$ are mapped, that is, a frequency domain position set $$k_{idx}^1,$$

may be $$K_{idx}^1,$$

where values of $p_0$ and $p_1$ are different, $p_0 \in \{0, 1, P-1\}$, and $p_1 \in \{0, 1, \ldots, P-1\}$.

Time domain positions to which $N_{rs}$ second reference signal sequences of different antenna ports are mapped may be different, that is, may be different elements in the first time domain position set $T_{idx}$. For example, the first time domain position set $T_{idx}$ includes two elements, that is, $N_{idx,T}=2$. In this case, time domain positions to which $N_{rs}$ second reference signal sequences of an antenna port $p_0$ are mapped, that is, a time domain position set $$t_{idx}^0, \text{ may be } T_{idx}^0;$$

and time domain positions to which $N_{rs}$ second reference signal sequences of an antenna port $p_1$ are mapped, that is, a time domain position set $$t_{idx}^1, \text{ may be } T_{idx}^1.$$

For a time domain position and a frequency domain position to which a second reference signal sequence of an antenna port may be mapped, several examples are listed below.

Figure 7:
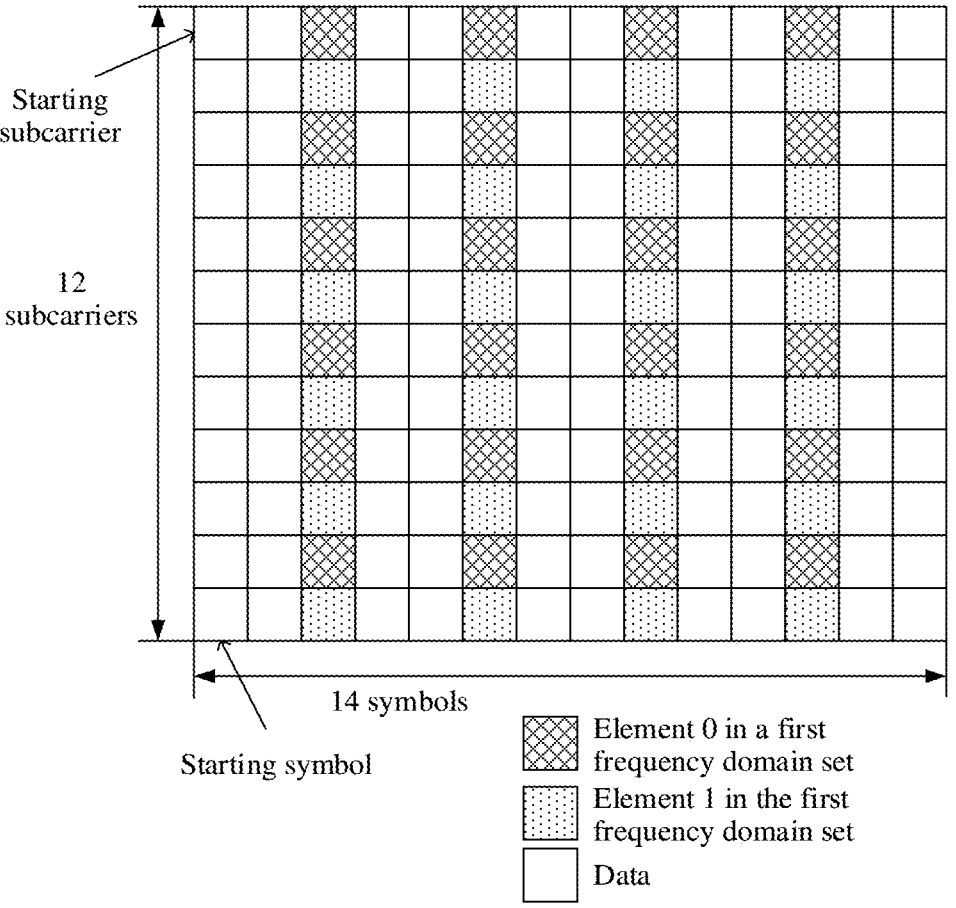
FIG. 7 shows an example of time-frequency positions to which second reference signal sequences of antenna ports are mapped.

For example, $N_{idx,T}=1$, and $N_{idx,K}>1$. An example is shown in FIG. 7. FIG. 7 shows an example of time-frequency positions to which second reference signal sequences of antenna ports are mapped. In FIG. 7, one resource unit includes one slot, one slot includes 14 symbols, that is, N=14, indexes of the 14 symbols are 0 to 13, each slot includes 12 subcarriers, that is, M=12, and indexes of the 12 subcarriers are 0 to 11. It is assumed that $N_{rs}=4$ and $M_{rs}=6$, to be specific, there are four second reference signal sequences, and each second reference signal sequence includes six elements. In FIG. 7, a first time domain position set $T_{idx}$ includes one element, and a value $$T_{idx}^0$$

of the element is [2, 5, 8, 11]; and a first frequency domain position set $K_{idx}$ includes two elements, where an element 0

$$K_{idx}^0$$

is [0, 2, 4, 6, 8, 10], and an element 1

$$K_{idx}^1$$

is [1, 3, 5, 7, 9, 11].

It should be noted that a quantity of symbols included in one resource unit and a quantity of subcarriers that correspond to each symbol in frequency domain and that are used for sending data in FIG. 7 are merely examples, and may alternatively have other values.

For example, one resource unit includes two slots and a total of 28 symbols, and each symbol may include two resource blocks and a total of 28 subcarriers. In this case, $$T_{idx}^0 = [2, 5, 8, 11, 16, 19, 22, 25],$$
$$K_{idx}^0 = [0, 2, 4, 6, 8, 10, 12, 14, 16, 18, 20, 22],$$
$$\text{and } K_{idx}^1 = [1, 3, 5, 7, 9, 11, 13, 15, 17, 19, 21, 23].$$

Figure 8:
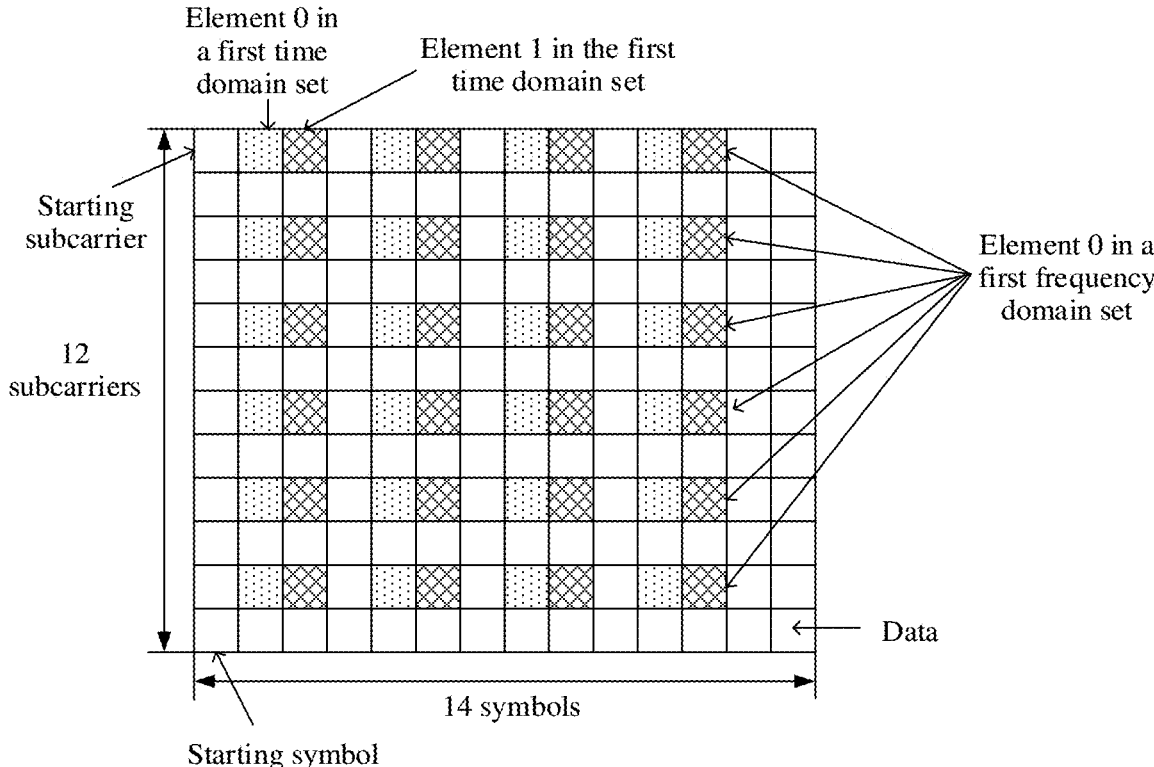
FIG. 8 shows an example of time-frequency positions to which second reference signal sequences of antenna ports are mapped.

For another example, $N_{idx,T}>1$, and $N_{idx,K}=1$. An example is shown in FIG. 8. FIG. 8 shows an example of time-frequency positions to which second reference signal sequences of antenna ports are mapped. In FIG. 8, one resource unit includes one slot, one slot includes 14 symbols, that is, N=14, indexes of the 14 symbols are 0 to 13, each slot includes 12 subcarriers, that is, M=12, and indexes of the 12 subcarriers are 0 to 11. It is assumed that $N_{rs}=4$ and $M_{rs}=6$, to be specific, there are four second reference signal sequences, and each second reference signal sequence includes six elements. In FIG. 8, a first time domain position set $T_{idx}$ includes two elements, where a value of an element 0

$$T_{idx}^0$$

is [1, 4, 7, 10], and a value of an element 1

$$T_{idx}^1$$

is [2, 5, 8, 11]; and a first frequency domain position set $K_{idx}$ includes one element, and a value $$K_{idx}^0$$

of the element is [0, 2, 4, 6, 8, 10].

Figure 9:
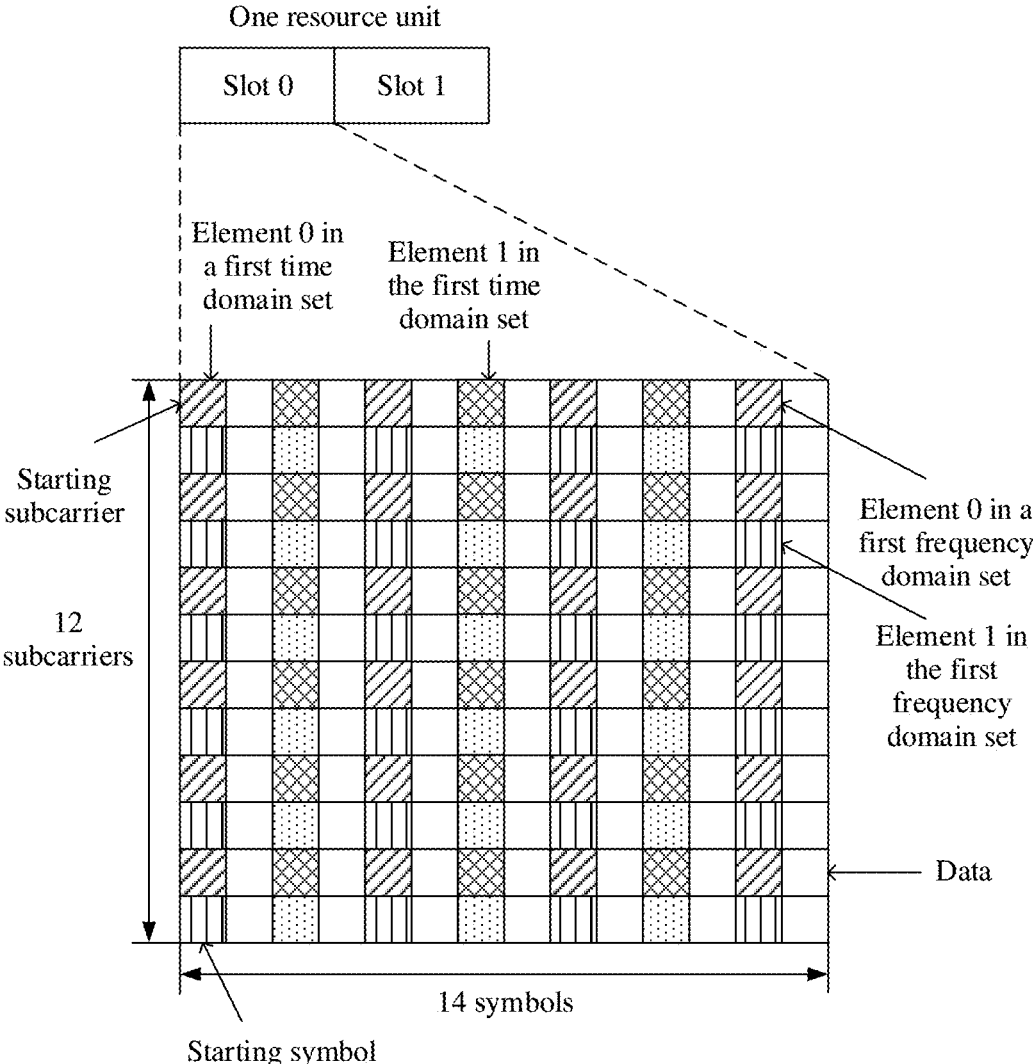
FIG. 9 shows an example of time-frequency positions to which second reference signal sequences of antenna ports are mapped.

For another example, $N_{idx,T}>1$, and $N_{idx,K}>1$. An example is shown in FIG. 9. FIG. 9 shows an example of time-frequency positions to which second reference signal sequences of antenna ports are mapped. In FIG. 9, one resource unit includes two slots, one slot includes 14 symbols, that is, the resource unit includes 28 symbols, indexes of the 28 symbols are 0 to 27, each symbol includes 12 subcarriers, that is, M=12, and indexes of the 12 subcarriers are 0 to 11. It is assumed that $N_{rs}=7$ and $M_{rs}=6$, to be specific, there are seven second reference signal sequences, and each second reference signal sequence includes six elements. In FIG. 9, a first time domain position set $T_{idx}$ includes two elements, where a value of an element 0

$$T_{idx}^0$$

is [0, 4, 8, 12, 16, 20, 24], and a value of an element 1

$$T_{idx}^1$$

is [2, 6, 10, 14, 18, 22, 26]; and a first frequency domain position set $K_{idx}$, includes two elements, where a value of an element 0

$$K_{idx}^0$$

is [0, 2, 4, 6, 8, 10], and a value of an element 1

$$K_{idx}^1$$

is [1, 3, 5, 7, 9, 11].

It can be learned that, when $N_{rs}$ second reference signal sequences of two antenna ports are mapped to different time domain positions, reference signals (namely, second reference signal sequences) sent by the two antenna ports are orthogonal. Likewise, when $N_{rs}$ second reference signal sequences of two antenna ports are mapped to different frequency domain positions, reference signals (namely, second reference signal sequences) sent by the two antenna ports are orthogonal. Therefore, based on the quantity $N_{idx,K}$ of elements included in the first frequency domain position set $K_{idx}$ and the quantity $N_{idx,T}$ of elements included in the first time domain position set $T_{idx}$, $N_{idx,K} \times N_{idx,T}$ different antenna ports may be provided for sending reference signals.

Orthogonality of reference signal sequences may be implemented for different antenna ports by using different combinations of time domain positions and frequency domain positions of second reference signal sequences, the frequency-domain cyclic shift factor, and the time-domain cyclic shift factor.

Each of the P antenna ports corresponds to a combination of one value of the frequency-domain cyclic shift factor, one value of the time-domain cyclic shift factor, and a time domain position and a frequency domain position of a second reference signal sequence. Any two of the P antenna ports correspond to different combinations of values of the frequency-domain cyclic shift factor, values of the time-domain cyclic shift factor, and time domain positions and frequency domain positions of second reference signal sequences.

Therefore, it can be learned that, based on the quantity $N_F$ of values of the frequency-domain cyclic shift factor, the quantity $N_T$ of values of the time-domain cyclic shift factor, the quantity $N_{idx,K}$ of elements included in the first frequency domain position set $K_{idx}$, and the quantity $N_{idx,T}$ of elements included in the first time domain position set $T_{idx}$, there may be $N_F \times N_T \times N_{idx,K} \times N_{idx,T}$ different combinations, that is, $N_F \times N_T \times N_{idx,K} \times N_{idx,T}$ antenna ports can be supported. It can be learned that a capacity of reference signals can be significantly increased in the solution provided in this embodiment of this application.

In the foregoing embodiment, lengths of the N symbols included in the resource unit are the same, in other words, subcarrier spacings of the N symbols included in the resource unit are the same.

In another implementation, when $N>N_{rs}$ is met, duration of each of the $N_{rs}$ symbols used to carry second reference signal sequences is different from duration of each of the other $(N-N_{rs})$ symbols of the N symbols.

Herein, the other $(N-N_{rs})$ symbols are remaining symbols obtained by excluding the $N_{rs}$ symbols from the N symbols included in the resource unit.

For example, the N symbols are OFDM symbols or SC-FDMA symbols, and a subcarrier spacing of the $N_{rs}$ symbols used to carry second reference signal sequences is different from a subcarrier spacing of the other $(N-N_{rs})$ symbols. The subcarrier spacing of the $N_{rs}$ symbols used to carry second reference signal sequences may be P times of the subcarrier spacing of the other $(N-N_{rs})$ symbols, where P is a positive integer greater than 1. In addition, a quantity of subcarriers included in each of the $N_{rs}$ symbols used to carry second reference signal sequences is 1/P of a quantity of subcarriers included in each of the other $(N-N_{rs})$ symbols. In this case, it can be learned that the duration of each of the $N_{rs}$ symbols used to carry second reference signal sequences is 1/P of the duration of each of the other $(N-N_{rs})$ symbols.

For example, assuming that duration of a resource unit is 1 ms, when subcarrier spacings of N symbols included in the resource unit are the same, as shown in FIG. 5, the resource unit includes 14 symbols, a subcarrier spacing of each symbol is 15 kHz, and duration of each symbol is approximately 66.66 μs, without considering a cyclic prefix (cyclic prefix, CP). In FIG. 5, $N_{rs}=4$, and $N-N_{rs}=10$.

When a subcarrier spacing of the $N_{rs}$ symbols used to carry second reference signal sequences is twice (P=2) a subcarrier spacing of the other $(N-N_{rs})$ symbols of the N symbols, the subcarrier spacing of the $N_{rs}$ symbols is 30 kHz, where duration of each of the $N_{rs}$ symbols is approximately 33.33 μs; and the subcarrier spacing of the other $(N-N_{rs})$ symbols is 15 kHz, where duration of each of the other $(N-N_{rs})$ symbols is approximately 66.66 μs. It can be learned that duration of two symbols with a subcarrier spacing of 30 kHz is the same as duration of one symbol with a subcarrier spacing of 15 kHz. Therefore, a quantity N of symbols in a 1 ms resource unit may be 18, $N_{rs}=8$, and $N-N_{rs}=10$.

It can be learned that, when the subcarrier spacing of the $N_{rs}$ symbols used to carry second reference signal sequences is different from the subcarrier spacing of the other $(N-N_{rs})$ symbols, compared with the case in which the subcarrier spacings of the N symbols are the same, a quantity (namely, a value of $N_{rs}$) of symbols for carrying second reference signal sequences can be increased, so that a capacity of second reference signal sequences is increased. In addition, in a high-speed moving scenario, a quantity of symbols for carrying second reference signal sequences is increased, so that a channel change can be more accurately tracked, thereby improving demodulation performance.

The foregoing describes in detail the reference signal sending method provided in this application. The following describes a communication apparatus provided in this application.

Figure 10:
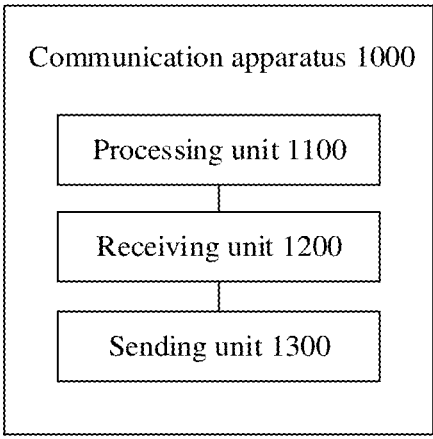
FIG. 10 is a schematic block diagram of a communication apparatus according to this application.

FIG. 10 is a schematic block diagram of a communication apparatus according to this application. As shown in FIG. 10, the communication apparatus 1000 includes a processing unit 1100, a receiving unit 1200, and a sending unit 1300.

The processing unit 1100 is configured to obtain a frequency-domain cyclic shift factor and a time-domain cyclic shift factor, where the frequency-domain cyclic shift factor and the time-domain cyclic shift factor are used to perform phase rotation on a reference signal sequence.

The processing unit 1100 is further configured to generate a second reference signal sequence based on a first reference signal sequence, the frequency-domain cyclic shift factor, and the time-domain cyclic shift factor.

The sending unit 1300 is configured to send the second reference signal sequence on an antenna port p, where $p \in \{0, 1, \ldots, P-1\}$, and P is an integer greater than or equal to 1.

Optionally, in an embodiment, the processing unit 1100 is configured to:

generate $N_{rs}$ second reference signal sequences in a second reference signal sequence set based on the first reference signal sequence, the frequency-domain cyclic shift factor, and the time-domain cyclic shift factor, where the first reference signal sequence and each second reference signal sequence each include $M_{rs}$ elements, $N_{rs}>1$ and is an integer, and $M_{rs}>1$ and is an integer; and perform phase rotation on an element m of the first reference signal sequence by using $e^{j \cdot \alpha_F m}$ and $e^{j \cdot \alpha_T t}$, to obtain an element m of a second reference signal sequence t in the second reference signal sequence set, where $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

Optionally, in an embodiment, the sending unit 1300 is configured to:

send, in one resource unit, the $N_{rs}$ second reference signal sequences included in the second reference signal sequence set, where the resource unit includes N symbols in time domain, each symbol includes M subcarriers in frequency domain, the $N_{rs}$ second reference signal sequences are mapped to $N_{rs}$ symbols of the N symbols, each second reference signal sequence is mapped to one of the N symbols, each second reference signal sequence is mapped to $M_{rs}$ subcarriers of one of the $N_{rs}$ symbols, $N \geq N_{rs}$, $M \geq M_{rs}$, and both N and M are positive integers.

Optionally, in an embodiment, the resource unit includes one slot in time domain, the slot includes N symbols, and each symbol includes M subcarriers in frequency domain.

The $N_{rs}$ symbols are arranged at equal intervals based on a first value width in the N symbols, and/or the $M_{rs}$ subcarriers are arranged at equal intervals based on a second value width in the M subcarriers included in each symbol of the slot, where the first value width $K_T$ meets the following formula: $K_T = N/N_{rs}$, the second value width $K_F$ meets the following formula: $K_F = M/M_{rs}$, and $K_T$ and $K_F$ are positive integers.

Optionally, in an embodiment, the resource unit includes S slots in time domain, each slot includes N/S symbols, each symbol includes the M subcarriers in frequency domain, and N/S is an integer.

The $N_{rs}$ second reference signal sequences are mapped to $N_{rs}$ symbols of the N symbols included in the S slots, and each second reference signal sequence is mapped to $M_{rs}$ subcarriers of one of the $N_{rs}$ symbols.

Optionally, in an embodiment, each of P antenna ports included in the set $\{0, 1, \ldots, P-1\}$ corresponds to a combination of one value of the frequency-domain cyclic shift factor and one value of the time-domain cyclic shift factor. When a value, corresponding to each antenna port, of the frequency-domain cyclic shift factor is uniquely determined, a value, corresponding to the antenna port, of the time-domain cyclic shift factor is also uniquely determined. Combinations, corresponding to any two of the P antenna ports, of values of the frequency-domain cyclic shift factor and values of the time-domain cyclic shift factor are different.

Optionally, in an embodiment, the frequency-domain cyclic shift factor and the time-domain cyclic shift factor are respectively expressed by using the following formulas:

$$\alpha_F = \pm \frac{2\pi}{N_F} \times \beta_F, \text{ and } \alpha_T = \pm \frac{2\pi}{N_T} \times \beta_T, \text{ where}$$

$\alpha_F$ is the frequency-domain cyclic shift factor, $N_F$ is an integer, $\beta_F$ is an integer, a value range of $\beta_F$ is [0, $N_F-1$], $\alpha_T$ is the time-domain cyclic shift factor, $N_T$ is an integer, $\beta_T$ is an integer, and a value range of $\beta_T$ is [0, $N_T-1$].

In the foregoing implementations, the receiving unit 1200 and the sending unit 1300 may be alternatively integrated into one transceiver unit that has both a receiving function and a sending function. This is not limited herein.

Optionally, in an example, the communication apparatus 1000 may be the transmit end in the method embodiments. In this case, the receiving unit 1200 may be a receiver, and the sending unit 1300 may be a transmitter. The receiver and the transmitter may be alternatively integrated into one transceiver.

Optionally, in another example, the communication apparatus 1000 may be a chip or an integrated circuit mounted in the transmit end. In this case, the receiving unit 1200 and the sending unit 1300 may be communication interfaces or interface circuits. For example, the receiving unit 1200 is an input interface or an input circuit, and the sending unit 1300 is an output interface or an output circuit.

In the examples, the processing unit 1100 is configured to perform processing and/or operations implemented inside the transmit end other than a sending or receiving action.

Optionally, the processing unit 1100 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 1000 performs the operations and/or the processing performed by the transmit end in the method embodiments.

Optionally, the processing apparatus may include only a processor, and a memory configured to store a computer program is located outside the processing apparatus. The processor is connected to the memory by using a circuit or a wire, to read and execute the computer program stored in the memory.

In some examples, the processing apparatus may be alternatively a chip or an integrated circuit. For example, the processing apparatus includes a processing circuit or a logic circuit and an interface circuit. The interface circuit is configured to receive a signal and/or data, and transmit the signal and/or the data to the processing circuit, and the processing circuit processes the signal and/or the data, so that the operations and/or the processing performed by the transmit end in the method embodiments are performed.

Figure 11:
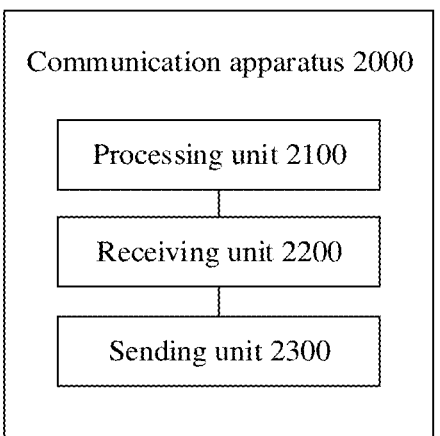
FIG. 11 is a schematic block diagram of another communication apparatus according to this application.

FIG. 11 is a schematic block diagram of another communication apparatus according to this application. As shown in FIG. 11, the communication apparatus 2000 includes a processing unit 2100, a receiving unit 2200, and a sending unit 2300.

The processing unit 2100 is configured to obtain a frequency-domain cyclic shift factor and a time-domain cyclic shift factor, where the frequency-domain cyclic shift factor and the time-domain cyclic shift factor are used to perform phase rotation on a reference signal sequence.

The receiving unit 2200 is configured to receive a second reference signal sequence from an antenna port p of a transmit end, where $p \in \{0, 1, \ldots, P-1\}$, and P is an integer greater than or equal to 1.

The processing unit 2100 is configured to demodulate the second reference signal sequence based on the frequency-domain cyclic shift factor and the time-domain cyclic shift factor.

Optionally, in an embodiment, the processing unit 2100 is configured to:

demodulate $N_{rs}$ second reference signal sequences in a second reference signal sequence set based on the frequency-domain cyclic shift factor and the time-domain cyclic shift factor, where an element m of a second reference signal sequence t in the second reference signal sequence set is obtained by performing phase rotation on an element m of a first reference signal sequence by using $e^{j \cdot \alpha_F \cdot m}$ and $e^{j \cdot \alpha_T \cdot t}$, the first reference signal sequence and each second reference signal sequence each include $M_{rs}$ elements, $N_{rs} \geq 1$ and is an integer, $M_{rs} \geq 1$ and is an integer, $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

Optionally, in an embodiment, the receiving unit 2200 is configured to:

receive the $N_{rs}$ second reference signal sequences that are included in the second reference signal sequence set in one resource unit and that come from the antenna port p of the transmit end, where the resource unit includes N symbols in time domain, each symbol includes M subcarriers in frequency domain, the $N_{rs}$ second reference signal sequences are mapped to $N_{rs}$ symbols of the N symbols, each second reference signal sequence is mapped to one of the N symbols, each second reference signal sequence is mapped to $M_{rs}$ subcarriers of one of the $N_{rs}$ symbols, $N \geq N_{rs}$, $M \geq M_{rs}$, and both N and M are positive integers.

Optionally, in an embodiment, the resource unit includes one slot in time domain, the slot includes N symbols, and each symbol includes M subcarriers in frequency domain. The $N_{rs}$ symbols are arranged at equal intervals based on a first value width in the N symbols, and/or the $M_{rs}$ subcarriers are arranged at equal intervals based on a second value width in the M subcarriers included in each symbol of the slot, where the first value width $K_T$ meets the following formula: $K_T = N/N_{rs}$, the second value width $K_F$ meets the following formula: $K_F = M/M_{rs}$, and $K_T$ and $K_F$ are positive integers.

Optionally, in an embodiment, the resource unit includes S slots in time domain, each slot includes N/S symbols, each symbol includes the M subcarriers in frequency domain, and N/S is an integer.

The $N_{rs}$ second reference signal sequences are mapped to $N_{rs}$ symbols of the N symbols included in the S slots, and each second reference signal sequence is mapped to $M_{rs}$ subcarriers of one of the $N_{rs}$ symbols.

Optionally, in an embodiment, each of P antenna ports included in the set {0, 1, . . . , P−1} corresponds to a combination of one value of the frequency-domain cyclic shift factor and one value of the time-domain cyclic shift factor. When a value, corresponding to each antenna port, of the frequency-domain cyclic shift factor is uniquely determined, a value, corresponding to the antenna port, of the time-domain cyclic shift factor is also uniquely determined. Combinations, corresponding to any two of the P antenna ports, of values of the frequency-domain cyclic shift factor and values of the time-domain cyclic shift factor are different.

Optionally, in an embodiment, the frequency-domain cyclic shift factor and the time-domain cyclic shift factor are respectively expressed by using the following formulas:

$$\alpha_F = \pm \frac{2\pi}{N_F} \times \beta_F, \text{ and } \alpha_T = \pm \frac{2\pi}{N_T} \times \beta_T,$$

where $\alpha_F$ is the frequency-domain cyclic shift factor, $N_F$ is an integer, $\beta_F$ is an integer, a value range of $\beta_F$ is [0, $N_F$−1], $\alpha_T$ is the time-domain cyclic shift factor, $N_T$ is an integer, $\beta_T$ is an integer, and a value range of $\beta_T$ is [0, $N_T$−1].

In the foregoing implementations, the receiving unit 2200 and the sending unit 2300 may be alternatively integrated into one transceiver unit that has both a receiving function and a sending function. This is not limited herein.

Optionally, in an example, the communication apparatus 2000 may be the receive end in the method embodiments. In this case, the receiving unit 2200 may be a receiver, and the sending unit 2300 may be a transmitter. The receiver and the transmitter may be alternatively integrated into one transceiver.

Optionally, in another example, the communication apparatus 2000 may be a chip or an integrated circuit mounted in the receive end. In this case, the receiving unit 2200 and the sending unit 2300 may be communication interfaces or interface circuits. For example, the receiving unit 2200 is an input interface or an input circuit, and the sending unit 2300 is an output interface or an output circuit.

In the examples, the processing unit 2100 is configured to perform processing and/or operations implemented inside the receive end other than a sending or receiving action.

Optionally, the processing unit 2100 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the communication apparatus 2000 performs the operations and/or the processing performed by the receive end in the method embodiments.

Optionally, the processing apparatus may include only a processor, and a memory configured to store a computer program is located outside the processing apparatus. The processor is connected to the memory by using a circuit or a wire, to read and execute the computer program stored in the memory.

Optionally, in some examples, the processing apparatus may be alternatively a chip or an integrated circuit. For example, the processing apparatus includes a processing circuit or a logic circuit and an interface circuit. The interface circuit is configured to receive a signal and/or data, and transmit the signal and/or the data to the processing circuit, and the processing circuit processes the signal and/or the data, so that the operations performed by the receive end in the method embodiments are performed.

Figure 12:
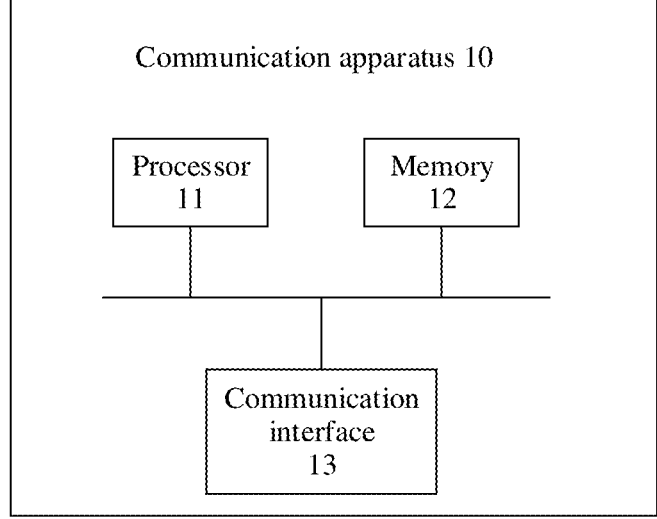
FIG. 12 is a schematic diagram of a structure of a communication apparatus according to this application.

FIG. 12 is a schematic diagram of a structure of a communication apparatus according to this application. As shown in FIG. 12, the communication apparatus 10 includes one or more processors 11, one or more memories 12, and one or more communication interfaces 13. The processor 11 is configured to control the communication interface 13 to send or receive a signal. The memory 12 is configured to store a computer program. The processor 11 is configured to invoke the computer program from the memory 12 and run the computer program, so that the processes and/or the operations performed by the transmit end in the method embodiments of this application are performed.

For example, the processor 11 may have a function of the processing unit 1100 shown in FIG. 10, and the communication interface 13 may have a function of the receiving unit 1200 and/or the sending unit 1300 shown in FIG. 10. The processor 11 may be configured to perform the processing or the operations performed by the transmit end in FIG. 1 to FIG. 9, and the communication interface 13 is configured to perform the sending action and/or the receiving action performed by the transmit end in FIG. 1 to FIG. 9.

In an implementation, the communication apparatus 10 may be the transmit end in the method embodiments. In this implementation, the communication interface 13 may be a transceiver. The transceiver may include a receiver and a transmitter. Optionally, the processor 11 may be a baseband apparatus, and the communication interface 13 may be a radio frequency apparatus. In another implementation, the communication apparatus 10 may be a chip or an integrated circuit mounted in the transmit end. In this implementation, the communication interface 13 may be an interface circuit or an input/output interface.

Figure 13:
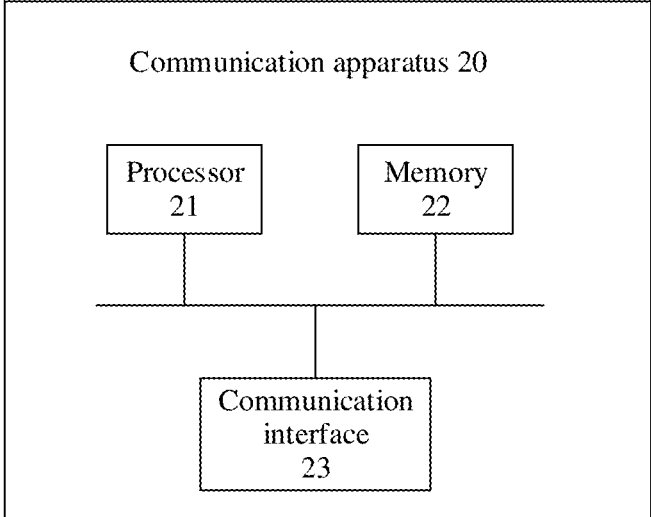
FIG. 13 is a schematic diagram of a structure of another communication apparatus according to this application.

FIG. 13 is a schematic diagram of a structure of another communication apparatus according to this application. As shown in FIG. 13, the communication apparatus 20 includes one or more processors 21, one or more memories 22, and one or more communication interfaces 23. The processor 21 is configured to control the communication interface 23 to send or receive a signal. The memory 22 is configured to store a computer program. The processor 21 is configured to invoke the computer program from the memory 22 and run the computer program, so that the processes and/or the operations performed by the receive end in the method embodiments of this application are performed.

For example, the processor 21 may have a function of the processing unit 2100 shown in FIG. 11, and the communication interface 23 may have a function of the receiving unit 2200 and/or the sending unit 2300 shown in FIG. 11. The processor 21 may be configured to perform the processing or the operations performed by the receive end in FIG. 1 to FIG. 9, and the communication interface 33 is configured to perform the sending action and/or the receiving action performed by the receive end in FIG. 1 to FIG. 9.

In an implementation, the communication apparatus 20 may be the receive end in the method embodiments. In this implementation, the communication interface 23 may be a transceiver. The transceiver may include a receiver and a transmitter. Optionally, the processor 21 may be a baseband apparatus, and the communication interface 23 may be a radio frequency apparatus. In another implementation, the communication apparatus 20 may be a chip or an integrated circuit mounted in the receive end. In this implementation, the communication interface 23 may be an interface circuit or an input/output interface.

Optionally, the memory and the processor in the foregoing apparatus embodiments may be physically independent units, or the memory and the processor may be integrated together. This is not limited in this specification.

In addition, this application further provides a computer-readable storage medium. The computer-readable storage medium stores computer instructions. When the computer instructions are run on a computer, the operations and/or the processes performed by the transmit end in the method embodiments of this application are performed.

This application further provides a computer-readable storage medium. The computer-readable storage medium stores computer instructions. When the computer instructions are run on a computer, the operations and/or the processes performed by the receive end in the method embodiments of this application are performed.

In addition, this application further provides a computer program product. The computer program product includes computer program code or instructions. When the computer program code or the instructions are run on a computer, the operations and/or the processes performed by the transmit end in the method embodiments of this application are performed.

This application further provides a computer program product. The computer program product includes computer program code or instructions. When the computer program code or the instructions are run on a computer, the operations and/or the processes performed by the receive end in the method embodiments of this application are performed.

In addition, this application further provides a chip. The chip includes a processor. A memory configured to store a computer program is disposed separately from the chip. The processor is configured to execute the computer program stored in the memory, so that a transmit end in which the chip is mounted performs the operations and/or the processing performed by the transmit end in any method embodiment.

Further, the chip may further include a communication interface. The communication interface may be an input/output interface, an interface circuit, or the like. Further, the chip may further include the memory.

This application further provides a chip. The chip includes a processor. A memory configured to store a computer program is disposed separately from the chip. The processor is configured to execute the computer program stored in the memory, so that a receive end on which the chip is mounted performs the operations and/or the processing performed by the receive end in any method embodiment.

Further, the chip may further include a communication interface. The communication interface may be an input/output interface, an interface circuit, or the like. Further, the chip may further include the memory.

In addition, this application further provides a communication apparatus (which may be, for example, a chip), including a processor and a communication interface. The communication interface is configured to receive a signal and transmit the signal to the processor. The processor processes the signal, so that the operations and/or the processing performed by the transmit end in any method embodiment are performed.

When the communication apparatus is a chip, the chip is configured to generate the second reference signal sequence, and a communication apparatus in which the chip is mounted can be enabled to perform the operation of sending a reference signal in embodiments of this application.

This application further provides a communication apparatus (which may be, for example, a chip), including a processor and a communication interface. The communication interface is configured to receive a signal and transmit the signal to the processor. The processor processes the signal, so that the operations and/or the processing performed by the receive end in any method embodiment are performed.

When the communication apparatus is a chip, the chip is configured to generate the second reference signal sequence, and a communication apparatus in which the chip is mounted can be enabled to perform the operation of receiving a reference signal in embodiments of this application.

In addition, this application further provides a communication apparatus, including at least one processor. The at least one processor is coupled to at least one memory. The at least one processor is configured to execute a computer program or instructions stored in the at least one memory, so that the operations and/or the processing performed by the transmit end in any method embodiment are performed.

This application further provides a communication apparatus, including at least one processor. The at least one processor is coupled to at least one memory. The at least one processor is configured to execute a computer program or instructions stored in the at least one memory, so that the operations and/or the processing performed by the receive end in any method embodiment are performed.

In addition, this application further provides a communication device, including a processor, a memory, and a transceiver. The memory is configured to store a computer program. The processor is configured to invoke the computer program stored in the memory and run the computer program, and control the transceiver to send or receive a signal, so that a transmit end performs the operations and/or the processing performed by the transmit end in any method embodiment.

This application further provides a communication device, including a processor, a memory, and a transceiver. The memory is configured to store a computer program. The processor is configured to invoke the computer program stored in the memory and run the computer program, and control the transceiver to send or receive a signal, so that a receive end performs the operations and/or the processing performed by the receive end in any method embodiment.

In addition, this application further provides a wireless communication system, including the transmit end and the receive end in embodiments of this application.

Optionally, in uplink transmission, the transmit end is a terminal device, and the receive end is a network device; and in downlink transmission, the transmit end is a network device, and the receive end is a terminal device.

The processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EE-PROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DRRAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit.

The term "and/or" in this application describes only an association relationship for describing associated objects and represents that there may be three relationships. For example, A and/or B may represent the following three cases: Only A exists, both A and B exist, and only B exists. A, B, and C may be singular or plural. This is not limited.

In embodiments of this application, the numbers such as "first" and "second" are used to distinguish between same items or similar items that have a basically same function and effect. A person skilled in the art can understand that the "first" and the "second" are not intended to limit a quantity or a sequence, and the "first", the "second", and the like do not mean being definitely different either.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The protection scope of this application shall be subject to the protection scope of the claims.

What is claimed is:

1. A reference signal sending method, comprising:

obtaining a frequency-domain cyclic shift factor and a time-domain cyclic shift factor, wherein the frequency-domain cyclic shift factor and the time-domain cyclic shift factor are useable to perform phase rotation on a reference signal sequence;

generating a second reference signal sequence based on a first reference signal sequence, the frequency-domain cyclic shift factor, and the time-domain cyclic shift factor; and sending the second reference signal sequence on an antenna port p, wherein p is an element in a set {0, 1, . . . , P−1}, and P is an integer greater than or equal to 1, wherein the generating the second reference signal sequence based on the first reference signal sequence, the frequency-domain cyclic shift factor, and the time-domain cyclic shift factor comprises:

generating $N_{rs}$ second reference signal sequences in a second reference signal sequence set based on the first reference signal sequence, the frequency-domain cyclic shift factor, and the time-domain cyclic shift factor, wherein the first reference signal sequence and each second reference signal sequence of the $N_{rs}$ second reference signal sequences comprise $M_{rs}$ elements, where $N_{rs} \geq 1$ and is an integer, and $M_{rs} \geq 1$ and is an integer.

2. The method according to claim 1, wherein the generating the second reference signal sequence based on the first reference signal sequence, the frequency-domain cyclic shift factor, and the time-domain cyclic shift factor further comprises:

performing phase rotation on an element m of the first reference signal sequence by $e^{j \cdot \alpha_F \cdot m}$ and $e^{j \cdot \alpha_T \cdot t}$, to obtain an element m of a second reference signal sequence t in the second reference signal sequence set, wherein $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

3. The method according to claim 2, wherein the sending the second reference signal sequence comprises:

sending, in one resource unit, the $N_{rs}$ second reference signal sequences in the second reference signal sequence set, wherein the one resource unit comprises N symbols in a time domain, each symbol of the N symbols comprises M subcarriers in a frequency domain, the $N_{rs}$ second reference signal sequences are mapped to $N_{rs}$ symbols of the N symbols, each second reference signal sequence of the $N_{rs}$ second reference signal sequences is mapped to one of the N symbols, each second reference signal sequence of the $N_{rs}$ second reference signal sequences is mapped to $M_{rs}$ subcarriers of one of the $N_{rs}$ symbols, where $N \geq N_{rs}$, $M \geq M_{rs}$, and both N and M are positive integers.

4. The method according to claim 3, wherein the one resource unit further comprises one slot in the time domain, the one slot comprises the N symbols; and the $N_{rs}$ symbols of the N symbols are arranged at equal intervals based on a first value width in the N symbols, or the $M_{rs}$ subcarriers are arranged at equal intervals based on a second value width in the M subcarriers comprised in each symbol of the slot, wherein the first value width $K_T$ satisfies the following formula: $K_T = N/N_{rs}$, where the second value width $K_F$ satisfies the following formula: $K_F = M/M_{rs}$, and $K_T$ and $K_F$ are positive integers.

5. The method according to claim 3, wherein the one resource unit further comprises S slots in the time domain, each slot of the S slots comprises N/S symbols, and N/S is an integer; and the $N_{rs}$ second reference signal sequences are mapped to the $N_{rs}$ symbols of the N symbols comprised in the S slots.

6. The method according to claim 1, wherein each of P antenna ports comprised in the set {0, 1, . . . , P−1} corresponds to a combination of one value of the frequency-domain cyclic shift factor and one value of the time-domain cyclic shift factor;

in response to a value, corresponding to each antenna port, of the frequency-domain cyclic shift factor is uniquely determined, a value, corresponding to the antenna port, of the time-domain cyclic shift factor is also uniquely determined; and combinations, corresponding to two of the P antenna ports, of values of the frequency-domain cyclic shift factor and values of the time-domain cyclic shift factor are different from each other.

7. The method according to claim 1, wherein the frequency-domain cyclic shift factor ($\alpha_F$) and the time-domain cyclic shift factor ($\alpha_T$) are respectively represented by the following formulas:

$$\alpha_F = \pm \frac{2\pi}{N_F} \times \beta_F, \ \alpha_T = \pm \frac{2\pi}{N_T} \times \beta_T,$$

wherein $\alpha_F$ is the frequency-domain cyclic shift factor, $N_F$ is an integer, $\beta_F$ is an integer, a value range of $\beta_F$ is [0, $N_F - 1$], $\alpha_T$ is the time-domain cyclic shift factor, $N_T$ is an integer, $\beta_T$ is an integer, and a value range of $\beta_T$ is [0, $N_T - 1$].

8. A reference signal receiving method, comprising:

obtaining a frequency-domain cyclic shift factor and a time-domain cyclic shift factor, wherein the frequency-domain cyclic shift factor and the time-domain cyclic shift factor are useable to perform phase rotation on a reference signal sequence;

receiving a second reference signal sequence from an antenna port p of a transmitter, wherein p is an element in a set {0, 1, . . . , P−1}, and P is an integer greater than or equal to 1; and demodulating the second reference signal sequence based on the frequency-domain cyclic shift factor and the time-domain cyclic shift factor, wherein the demodulating the second reference signal sequence based on the frequency-domain cyclic shift factor and the time-domain cyclic shift factor comprises:

demodulating $N_{rs}$ second reference signal sequences in a second reference signal sequence set based on the frequency-domain cyclic shift factor and the time-domain cyclic shift factor.

9. The method according to claim 8, wherein an element m of a second reference signal sequence t in the second reference signal sequence set is obtained by performing phase rotation on an element m of a first reference signal sequence by $e^{j \cdot \alpha_F \cdot m}$ and $e^{j \cdot \alpha_T \cdot t}$, the first reference signal sequence and each second reference signal sequence of the $N_{rs}$ second reference signal sequences comprise $M_{rs}$ elements, where $N_{rs} \geq 1$ and is an integer, $M_{rs} \geq 1$ and is an integer, $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

10. The method according to claim 9, wherein the receiving the second reference signal sequence from the antenna port p of the transmitter comprises:

receiving the $N_{rs}$ second reference signal sequences in the second reference signal sequence set in one resource unit, wherein the one resource unit comprises N symbols in a time domain, each symbol of the N symbols comprises M subcarriers in a frequency domain, the $N_{rs}$ second reference signal sequences are mapped to $N_{rs}$ symbols of the N symbols, each second reference signal sequence of the $N_{rs}$ second reference signal sequences is mapped to one of the N symbols, each second reference signal sequence of the $N_{rs}$ second reference signal sequences is mapped to $M_{rs}$ subcarriers of one of the $N_{rs}$ symbols, $N \geq N_{rs}$, $M \geq M_{rs}$, and both N and M are positive integers.

11. The method according to claim 10, wherein the one resource unit further comprises one slot in the time domain, the one slot comprises the N symbols; and the $N_{rs}$ symbols of the N symbols are arranged at equal intervals based on a first value width in the N symbols, or the $M_{rs}$ subcarriers are arranged at equal intervals based on a second value width in the M subcarriers comprised in each symbol of the slot, wherein the first value width $K_T$ satisfies the following formula: $K_T = N/N_{rs}$, where the second value width $K_F$ satisfies the following formula: $K_F = M/M_{rs}$, and $K_T$ and $K_F$ are positive integers.

12. The method according to claim 10, wherein the one resource unit further comprises S slots in the time domain, each slot of the S slots comprises N/S symbols, and N/S is an integer; and the $N_{rs}$ second reference signal sequences are mapped to the $N_{rs}$ symbols of the N symbols comprised in the S slots.

13. The method according to claim 8, wherein each of P antenna ports comprised in the set $\{0, 1, \ldots, P-1\}$ corresponds to a combination of one value of the frequency-domain cyclic shift factor and one value of the time-domain cyclic shift factor;

in response to a value, corresponding to each antenna port, of the frequency-domain cyclic shift factor is uniquely determined, a value, corresponding to the antenna port, of the time-domain cyclic shift factor is also uniquely determined; and combinations, corresponding to two of the P antenna ports, of values of the frequency-domain cyclic shift factor and values of the time-domain cyclic shift factor are different from each other.

14. The method according to claim 8, wherein the frequency-domain cyclic shift factor ($\alpha_F$) and the time-domain cyclic shift factor ($\alpha_T$) are respectively represented by the following formulas:

$$\alpha_F = \pm \frac{2\pi}{N_F} \times \beta_F, \; \alpha_T = \pm \frac{2\pi}{N_T} \times \beta_T,$$

wherein $\alpha_F$ is the frequency-domain cyclic shift factor, $N_T$ is an integer, $\beta_F$ is an integer, a value range of $\beta_F$ is [0, $N_F-1$], $\alpha_T$ is the time-domain cyclic shift factor, $N_T$ is an integer, $\beta_T$ is an integer, and a value range of $\beta_T$ is [0, $N_T-1$].

15. A communication apparatus, comprising:

at least one processor and at least one non-transitory memory, wherein the non-transitory memory is configured to store non-transitory instructions, and in response to the at least one processor executing the non-transitory instructions, causes the communication apparatus to:

obtain a frequency-domain cyclic shift factor and a time-domain cyclic shift factor, wherein the frequency-domain cyclic shift factor and the time-domain cyclic shift factor are useable to perform phase rotation on a reference signal sequence;

generate a second reference signal sequence based on a first reference signal sequence, the frequency-domain cyclic shift factor, and the time-domain cyclic shift factor;

send the second reference signal sequence on an antenna port p, wherein p is an element in a set $\{0, 1, \ldots, P-1\}$, and P is an integer greater than or equal to 1; and generate $N_{rs}$ second reference signal sequences in a second reference signal sequence set based on the first reference signal sequence, the frequency-domain cyclic shift factor, and the time-domain cyclic shift factor, wherein the first reference signal sequence and each second reference signal sequence of the $N_{rs}$ second reference signal sequences comprise $M_{rs}$ elements, where $N_{rs} \geq 1$ and is an integer, and $M_{rs} \geq 1$ and is an integer.

16. The communication apparatus according to claim 15, wherein the at least one processor is further configured to execute the non-transitory instructions, further causing the communication apparatus to:

perform phase rotation on an element m of the first reference signal sequence by $e^{j \cdot \alpha_F \cdot m}$ and $e^{j \cdot \alpha_T \cdot t}$, to obtain an element m of a second reference signal sequence t in the second reference signal sequence set, wherein $0 \leq m < M_{rs}$, $0 \leq t < N_{rs}$, $\alpha_F$ is the frequency-domain cyclic shift factor, $\alpha_T$ is the time-domain cyclic shift factor, j indicates an imaginary unit, and both m and t are integers.

17. The communication apparatus according to claim 16, wherein the at least one processor is further configured to execute the non-transitory instructions, further causing the communication apparatus to:

send, in one resource unit, the $N_{rs}$ second reference signal sequences in the second reference signal sequence set, wherein the one resource unit comprises N symbols in a time domain, each symbol of the N symbols comprises M subcarriers in a frequency domain, the $N_{rs}$ second reference signal sequences are mapped to $N_{rs}$ symbols of the N symbols, each second reference signal sequence of the $N_{rs}$ second reference signal sequences is mapped to one of the N symbols, each second reference signal sequence of the $N_{rs}$ second reference signal sequences is mapped to $M_{rs}$ subcarriers of one of the $N_{rs}$ symbols, where $N \geq N_{rs}$, $M \geq M_{rs}$, and both N and M are positive integers.

18. The communication apparatus according to claim 17, wherein the resource unit further comprises one slot in the time domain, the one slot comprises the N symbols; and the $N_{rs}$ symbols of the N symbols are arranged at equal intervals based on a first value width in the N symbols, or the $M_{rs}$ subcarriers are arranged at equal intervals based on a second value width in the M subcarriers comprised in each symbol of the slot, wherein the first value width $K_T$ satisfies the following formula: $K_T = N/N_{rs}$, where the second value width $K_F$ satisfies the following formula: $K_F = M/M_{rs}$, and $K_T$ and $K_F$ are positive integers.

19. The communication apparatus according to claim 17, wherein the one resource unit further comprises S slots in the time domain, each slot of the S slots comprises N/S symbols, and N/S is an integer; and the $N_{rs}$ second reference signal sequences are mapped to the $N_{rs}$ symbols of the N symbols comprised in the S slots.

20. The communication apparatus according to claim 15, wherein each of P antenna ports comprised in the set $\{0, 1, \ldots, P-1\}$ corresponds to a combination of one value of the frequency-domain cyclic shift factor and one value of the time-domain cyclic shift factor;

in response to a value, corresponding to each antenna port, of the frequency-domain cyclic shift factor is uniquely determined, a value, corresponding to the antenna port, of the time-domain cyclic shift factor is also uniquely determined; and combinations, corresponding to two of the P antenna ports, of values of the frequency-domain cyclic shift factor and values of the time-domain cyclic shift factor are different from each other.

\* \* \* \* \*